(12) United States Patent
Sakurai

(10) Patent No.: US 6,545,978 B1
(45) Date of Patent: Apr. 8, 2003

(54) NETWORK MANAGING METHOD AND SYSTEM

(75) Inventor: Kenichi Sakurai, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/207,830

(22) Filed: Dec. 7, 1998

(30) Foreign Application Priority Data

Apr. 24, 1998 (JP) .......................................... 10-114608
Jun. 8, 1998 (JP) .......................................... 10-158836

(51) Int. Cl.⁷ ............................................ H04L 12/28
(52) U.S. Cl. ............................... 370/236.2; 370/236.1; 370/236; 370/230; 370/401; 370/389; 370/392; 709/223; 709/225; 707/9; 707/10; 345/736; 345/741
(58) Field of Search ........................... 370/241.1, 236.2, 370/236.1, 395.1, 395.2, 395.3, 395.31, 395.32, 401, 389, 230; 709/223, 225; 345/736, 741; 707/9, 10; 713/200, 202

(56) References Cited

U.S. PATENT DOCUMENTS

| | | | | |
|---|---|---|---|---|
| 5,038,348 A | * | 8/1991 | Yoda et al. | 714/38 |
| 5,550,821 A | * | 8/1996 | Akiyoshi | 370/601 |
| 5,630,135 A | * | 5/1997 | Orimo et al. | 709/106 |
| 5,719,863 A | * | 2/1998 | Hummel | 370/392 |
| 5,737,312 A | * | 4/1998 | Sasagawa | 370/232 |
| 5,872,770 A | * | 2/1999 | Park et al. | 370/241.1 |
| 5,920,558 A | * | 7/1999 | Saito et al. | 370/236.1 |
| 5,936,943 A | * | 8/1999 | Sakagami et al. | 370/236.2 |
| 5,956,681 A | * | 9/1999 | Yamakita | 704/231 |
| 6,056,786 A | * | 5/2000 | Rivera et al. | 795/712 |
| 6,205,143 B1 | * | 3/2001 | Lemieux | 370/395 |
| 6,240,455 B1 | * | 5/2001 | Kamasaka et al. | 709/200 |
| 6,249,522 B1 | * | 6/2001 | Komine | 370/399 |
| 6,279,006 B1 | * | 8/2001 | Shigemi et al. | 707/100 |
| 6,304,571 B1 | * | 10/2001 | Watanabe | 370/398 |
| 2001/0011273 A1 | * | 8/2001 | Matsui et al. | 707/9 |
| 2002/0007383 A1 | * | 1/2002 | Yoden et al. | 707/536 |

FOREIGN PATENT DOCUMENTS

| | | |
|---|---|---|
| JP | 5-252184 | 9/1993 |
| JP | 6-69946 | 3/1994 |
| JP | 7-235929 | 9/1995 |
| JP | 08-241248 * | 9/1996 |
| JP | 9-162899 | 6/1997 |
| JP | 9-102782 | 4/1998 |

* cited by examiner

Primary Examiner—Douglas W. Olms
Assistant Examiner—Van Nguyen
(74) Attorney, Agent, or Firm—Katten Muchin Zavis Rosenman

(57) ABSTRACT

In a network including a plurality of exchanges, an exchange at an order request destination is specified from a maintenance terminal of an exchange at an order request source, and an order for performing maintenance and management is input. The OAM cell including the order is generated and transmitted as an ODR-OAM cell. The exchange specified with the ODR-OAM cell performs the process according to the order, and transmits the result of the process to the order request source by using an ODR-OAM cell. The order request source receives the result of the process, and maintains and manages the network.

OAM cells in an ATM network are defined as OAM cells for a file update process. The first cell is an FVC-OAM cell for checking the version number of the system file of an exchange at an opposing exchange. The second cell is an FSP-OAM cell for preparing the start of the file update process. The third cell is an FIS-OAM cell for dividing a new file used for an update and carrying the file. The exchange which makes a file update request transmits the FVC-OAM cell to the destination exchange whose file is to be updated, and checks the version number of the file. If the version number of the file stored by the destination exchange is newer, whether or not the file update preparation is completed is determined by transmitting the FSP-OAM cell. After this determination is made, the new file is transmitted with FIS-OAM cells.

8 Claims, 33 Drawing Sheets

| FIELD | DESCRIPTION |
|---|---|
| REQUEST IDENTIFIER | • ACTION : ORDER IN EXECUTABLE FORM<br>• CREATE : ORDER FOR ADDING (GENERATING) INSTANCE<br>• DELETE : ORDER FOR DELETING INSTANCE<br>• SET : ORDER FOR CHANGING (SETTING) VALUE OF INSTANCE<br>• GET : ORDER FOR READING VALUE OF INSTANCE<br>• R-ACTION : RESPONSE TO ACTION ORDER<br>• R-CREATE : RESPONSE TO CREATE ORDER<br>• R-DELETE : RESPONSE TO DELETE ORDER<br>• R-SET : RESPONSE TO SET ORDER<br>• R-GET : RESPONSE TO GET ORDER |
| SEQUENCE NUMBER | SEQUENCE NUMBER WHEN ORDER DETAILS ARE DIVIDED AND TRANSMITTED |
| TOTAL NUMBER | TOTAL NUMBER OF DIVIDED ORDER DETAILS |
| REQUEST SOURCE LOCATION IDENTIFIER | LOCATION ID OF ORDER REQUEST SOURCE |
| REQUEST DESTINATION LOCATION IDENTIFIER | LOCATION ID OF ORDER REQUEST DESTINATION |
| ORDER DETAILS STORING AREA | AREA FOR STORING ORDER DETAILS |

FIG. 5

EXCHANGE A

|  | OPERATION X1 | OPERATION X2 | OPERATION X3 | ... |
|---|---|---|---|---|
| EXCHANGE B | O | X | X | ... |
| EXCHANGE C | O | O | O | ... |
| EXCHANGE D | X | X | X | ... |
| ⋮ | ⋮ | ⋮ | ⋮ | |

EXCHANGE C

|  | OPERATION X1 | OPERATION X2 | OPERATION X3 | ... |
|---|---|---|---|---|
| EXCHANGE A | X | O | X | ... |
| EXCHANGE B | O | O | O | ... |
| EXCHANGE D | X | X | O | ... |
| ⋮ | ⋮ | ⋮ | ⋮ | |

EXCHANGE D

|  | OPERATION X1 | OPERATION X2 | OPERATION X3 | ... |
|---|---|---|---|---|
| EXCHANGE A | O | X | X | ... |
| EXCHANGE B | X | O | O | ... |
| EXCHANGE C | O | X | X | ... |
| ⋮ | ⋮ | ⋮ | ⋮ | |

FIG. 7

NETWORK MANAGING METHOD AND SYSTEM

BACKGROUND OF THE INVENTION

1. Field of the Invention

The present invention relates to a network managing method and system for maintaining and managing an ATM (Asynchronous Transfer Mode) network.

2. Description of the Related Art

Recently, a variety of demands for information communications have been increasing, and not only data of conventional speech communications but also data such as image data etc. are required to be exchanged between users. Especially, a communications network must quickly transmit a large amount of information for a video telephone which exchanges moving images, etc. in real time. If a communications network accommodating such a video telephone only is separately arranged, it must be juxtaposed with a conventional telephone network, etc. Therefore, it is difficult to maintain such networks. As a result, there is a demand for a high-speed communications network where image data communications, etc. as well as conventional speech communications can be implemented. An analog line switching network such as a conventional telephone network, etc. is difficult to adopt as such a communications network, and a communications network implemented with a new method is required. An ATM communications network (ATM network) has been actively studied and developed as the most promising technique of such a communications network.

In the ATM communications network, information of voice, images, etc. are resolved into packets referred to as fixed-length cells, to each of which a VPI/VCI, that is, an address for a cell switching process, is assigned, and the cell is routed accordingly. In such an ATM communications network, user terminals are interconnected via communications lines arranged between ATM exchanges. The specification of an ATM exchange is standardized based on the recommendations of the ITU-T. Common carriers are currently developing ATM communications networks, conforming to these recommendations. The capabilities to be included in an ATM exchange, which is an important constituent element of an ATM communications network, are stipulated by the standardized recommendations. The typical configuration of the ATM exchange comprises a line corresponding unit for terminating a transmission line, an ATM switch for routing cells, and a process or for controlling all of the operations of the ATM exchange.

For an exchange configuring a network, a maintenance terminal for maintaining and managing the exchange itself is normally arranged. However, a centralized management center maintains and manages an entire network including exchanges. Therefore, the scale of the centralized management center becomes larger with the increase of the scale of the network. There is a demand for saving the cost of such maintenance and management of the network.

FIG. 1 is a block diagram for explaining the configuration of a conventional ATM network. 100 indicate exchanges. 101 indicates a centralized management center. 102 indicates an ATM switch. 103 and 104 indicate line corresponding units. 105 indicates a controlling unit. 106 indicates a maintenance terminal. The exchanges 100 have almost the same configuration where ATM cells are transmitted/received by the line corresponding units 103 and 104 and are routed by the ATM switch 102. A network is configured by interconnecting such exchanges 100 with lines.

The centralized management center 101 has the capability for maintaining and managing the network by collecting the information of the respective exchanges 100. The maintenance terminal 106 has the capability for maintaining and managing a local exchange, and the capability for transmitting/receiving information to/from the centralized management center 101 depending on need. However, the maintenance terminal 106 does not have the capability for maintaining and managing other exchanges.

An ATM cell transmitted over an ATM network has a 53-byte configuration composed of a 5-byte header and a 48-byte information field. ATM cells are classified into two major categories: a user cell and an OAM (Operation, Administration, and Maintenance) cell. The user cell transmits speech, images, data, etc. between subscribers using the information field. The OAM cell has a capability for monitoring performance, a capability for detecting a fault/problem, a capability for protecting a system, a capability for transmitting fault information/performance report information, a capability for identifying a location where a fault has occurred, etc. The OAM cell is transmitted by being inserted into an empty position of the user cell.

Typically, each of the exchanges 100 comprises the maintenance terminal 106, which has the capability for maintaining and managing a local exchange as described above. For example, the maintenance terminal 106 can establish/release a PVC (Permanent Virtual Channel) between an opposing exchange and a local exchange, and can read path information, etc. However, it does not have a capability for performing various control operations for other exchanges.

Accordingly, when a network fault occurs, the normality of a local exchange can be verified, but that of other exchanges 100 cannot be verified. Therefore, the centralized management center 101 isolates the location where a fault has occurred, and sets up a bypass, so that it becomes difficult to quickly recover from the fault.

The operations of an ATM exchange are controlled by a processor. When an ATM communications network is upgraded, the processes performed by the ATM exchange may sometimes be desired to be changed. In this case, the file or files including the program or software for running the processor must be updated.

Conventionally, a maintenance engineer visits all of the stations (including exchanges), which configure an ATM network, and loads a new file from the medium storing the new file into the processor of the exchange with the entry of a command, etc.

Additionally, the system version of each of the stations is read by the centralized management center, or that of an exchange is read by the maintenance engineer of each of the stations (with the entry of a command, etc.), in order to manage the version number of each of the stations.

Furthermore, the centralized management center stores the version number of each of the stations in a database.

As the number of constituent elements configuring an ATM network increases, the size of the database for managing version numbers become larger. As a result, a lot of system resources become necessary. Furthermore, a maintenance engineer must visit each station and perform the operation for updating each file at each station. Consequently, a considerable amount of labor is required to update files or databases.

SUMMARY OF THE INVENTION

An object of the present invention is to make a maintenance terminal included in an exchange perform the operations such as maintenance, management, etc. for another exchange or other exchanges with a relatively simple means.

A further object of the present invention is to provide a means for facilitating an update of a file of each ATM exchange in an ATM network, and for allowing management to be performed.

A network managing method according to the present invention is a method with which one exchange specifies, maintains, and manages another exchange in a network. This method comprises the steps of: transmitting an order for maintaining and managing an exchange at an order request destination by specifying this exchange from an exchange at an order request source, by using a control cell; and executing the order included in the control cell in the exchange at the order request destination which receives the control cell. Namely, this method allows the maintenance and management of another exchange by transmitting the order with the control cell.

The control cell is composed of a header and an information field. The information field includes a request identifier indicating the contents of an order, a sequence number when the order is divided and transmitted, and a total number indicating the number of divisions. Accordingly, a simple order may sometimes require only a single cell, whereas a complicated order requires a plurality of cells to be transmitted, into which the order is divided.

Additionally, the exchange at the order request destination sets the permission/prohibition of the execution of the order in a table, makes a comparison between the contents of the order included in the control cell and those of the table. The order can be executed only if the execution is permitted for the order from the exchange at the order request source.

Furthermore, the exchange at the order request destination may return to the exchange at the order request source the result of the execution of the order from the exchange at the order request source, and may make the maintenance terminal of the exchange itself display the contents of the order and the result of the execution of the order.

A network managing system according to the present invention is a managing system for maintaining and managing a network where a plurality of exchanges are interconnected. An exchange at an order request source includes a maintenance terminal for specifying an exchange at an order request destination and for inputting an order; a controlling unit for editing the order with the order input from the maintenance terminal, and for controlling respective units; line corresponding units for storing the order in the information field of a control cell and for transmitting the order according to an instruction from the controlling unit; and an ATM switch for routing an ATM cell. An exchange at an order request destination includes line corresponding units for receiving and identifying the control cell which is transmitted from the exchange at the order request source and is addressed to the local exchange itself, and for extracting the order stored in the control cell; a controlling unit for performing control according to the order extracted by the line corresponding units; and an ATM switch for routing an ATM cell.

Each of the line corresponding units included in the exchange at the order request source assigns a sequence number indicating a transmission order and a total number indicating the number of divisions, to each of control cells when the order is divided and transmitted. In the meantime, the line corresponding unit included in the exchange at the order request destination determines whether or not the reception of the order is completed, according to the sequence number and the total number of the received control cell, and transfers the order to the controlling unit.

Furthermore, the exchange at the order request destination may include a table for setting the permission/prohibition of the execution of the order transmitted from the exchange at the order request source. The controlling unit may determine whether the received order is either permitted or prohibited by referencing the table, and may execute the order only if the order is determined to be permitted.

Each of the line corresponding units included in the exchange at the order request destination returns to the exchange at the order request source the result of the execution of the order transmitted from the exchange at the order request source, under the control of the controlling unit. This unit may include a maintenance terminal for displaying the contents of the order and the result of the execution under the control of the controlling unit.

Furthermore, a method according to the present invention is a method for updating a file stored by a station on a VP/VC link in an ATM network. This method comprises the steps of: defining a control cell in the ATM network as a first control cell for checking the version number of the file stored at the station on the VP/VC link; transmitting the first control cell to the station over the VP/VC link; and obtaining the version number of the file stored at the station to which the first control cell is transmitted, from the response made to the first control cell transmitted to the station.

In this way, it is unnecessary to manage a huge amount of data for managing the version numbers of the files stored at respective stations on a VP/VC link in a single database, thereby reducing the resources used for managing a network.

Furthermore, the method according to the present invention may further comprise the steps of: defining a control cell in the ATM network as a second control cell for requesting the station on the VP/VC link to start the preparation of a file update operation; transmitting the second control cell to a station whose file must be updated; and starting the file update operation according to the response from the station whose file must be updated.

As described above, the start of the file update operation can be instructed to each station with control cells, whereby a maintenance engineer need not trouble to visit each station and perform the file update operation.

The method according to the present invention may further comprise the steps of: defining a control cell in the ATM network as a third control cell for carrying a new file required for an update to the station over the VP/VC link; and dividing the new file required for the update into third control cells, storing the new file in the third control cells, and transmitting the third control cells to the station whose file must be updated. Therefore, a maintenance engineer no longer needs to save the new file onto a storage medium such as a CD-ROM, etc., to carry the storage medium to each station, and to manually perform the file update operation, thereby facilitating the maintenance and management.

Here, the control cell refers to a cell for managing the network, particularly, to the OAM cell.

BRIEF DESCRIPTION OF THE DRAWINGS

FIG. 5 shows the fields of the ODR-OAM cell according to the first aspect of the preferred embodiment of the present invention;

FIG. 7 shows the tables for setting the permission/prohibition of execution;

DESCRIPTION OF THE PREFERRED EMBODIMENTS

Figure 2:
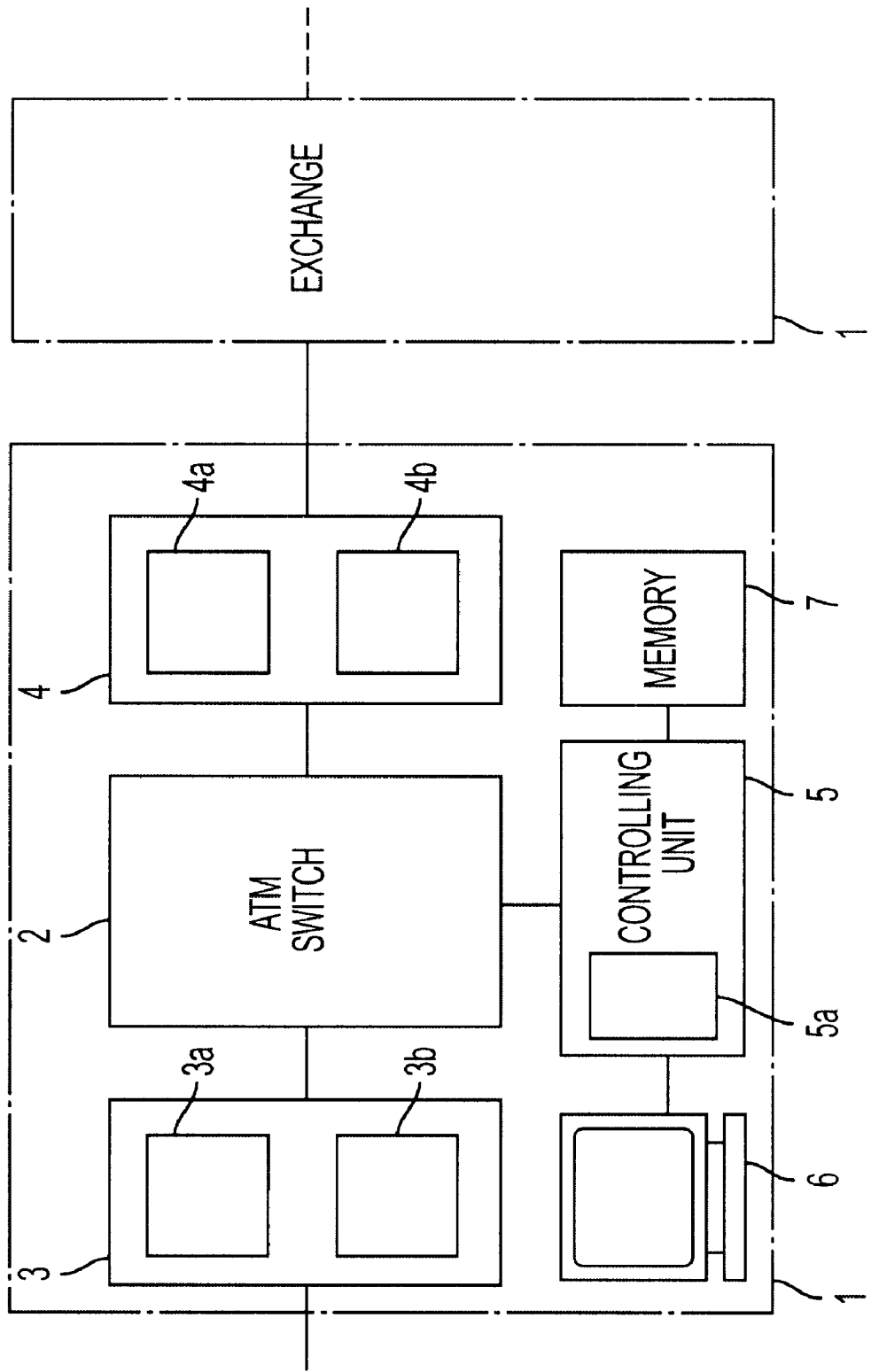
FIG. 2 is a block diagram showing the principal part of a preferred embodiment according to the present invention.

FIG. 2 is a block diagram showing the principal part of a preferred embodiment according to the present invention. 1 indicate exchanges. 2 indicates an ATM switch. 3 and 4 indicate line corresponding units. 5 indicates a controlling unit (processor). 6 indicates a maintenance terminal. 7 indicates a memory. 3a and 4a indicate transmitting/receiving units. 3b and 4b indicate cell processing units. 5a indicates an order processing unit.

Each of the exchanges 1 which configure a network comprises the ATM switch 2, the line corresponding units 3 and 4, the controlling unit 5, the maintenance terminal 6, and the memory 7. An order is input after an order request destination is specified from the maintenance terminal 6. The order is then edited by the order processing unit 5a included in the controlling unit 5, and is transferred to the cell processing units 3b and 4b, which are respectively included in the line corresponding units 3 and 4. Next, the order is stored in the information field of an OAM cell and is transmitted from the transmitting/receiving units 3a and 4a. Therefore, a centralized management center can be eliminated, and various types of orders can be transmitted with OAM cells from the maintenance terminal 6 included in a desired exchange to another exchange or other exchanges, not to mention to the local exchange itself.

Figure 3:
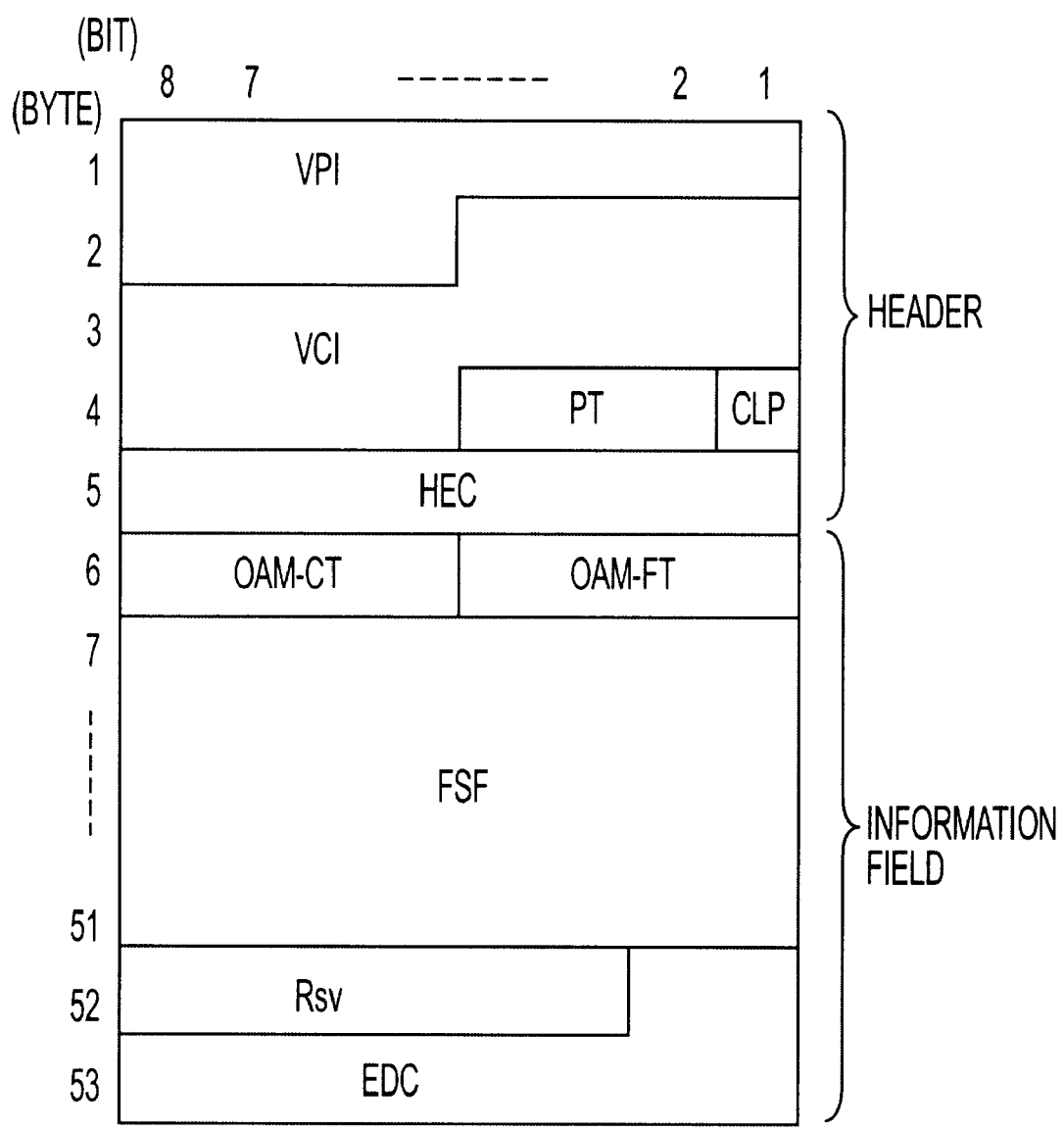
FIG. 3 shows the format of a fundamental OAM cell according to the preferred embodiment of the present invention.

FIG. 3 shows the format of a fundamental OAM cell. A 5-byte header is composed of a VPI (Virtual Path Identifier), a VCI (Virtual Channel Identifier), a PT (Payload Type), a CLP (Cell Loss Priority), and an HEC (Header Error Check), similar to a user cell.

A 48-byte information field is composed of a 4-bit OAM cell type OAM-CT (OAM Cell Type), a 4-bit OAM-FT (OAM Function Type), a 45-byte FSF (Function Specific Field), a 6-bit Rsv (Reserved area), and a 10-bit EDC (Error Detection Check).

According to the present invention, an order is stored in the function specific field FSF of the OAM cell, which is then transmitted, and a channel different from that of a conventional OAM cell is set in the OAM cell type OAM-CT and the OAM function type OAM-FT. This OAM cell is hereinafter referred to as an ODR-OAM cell.

Figure 4:
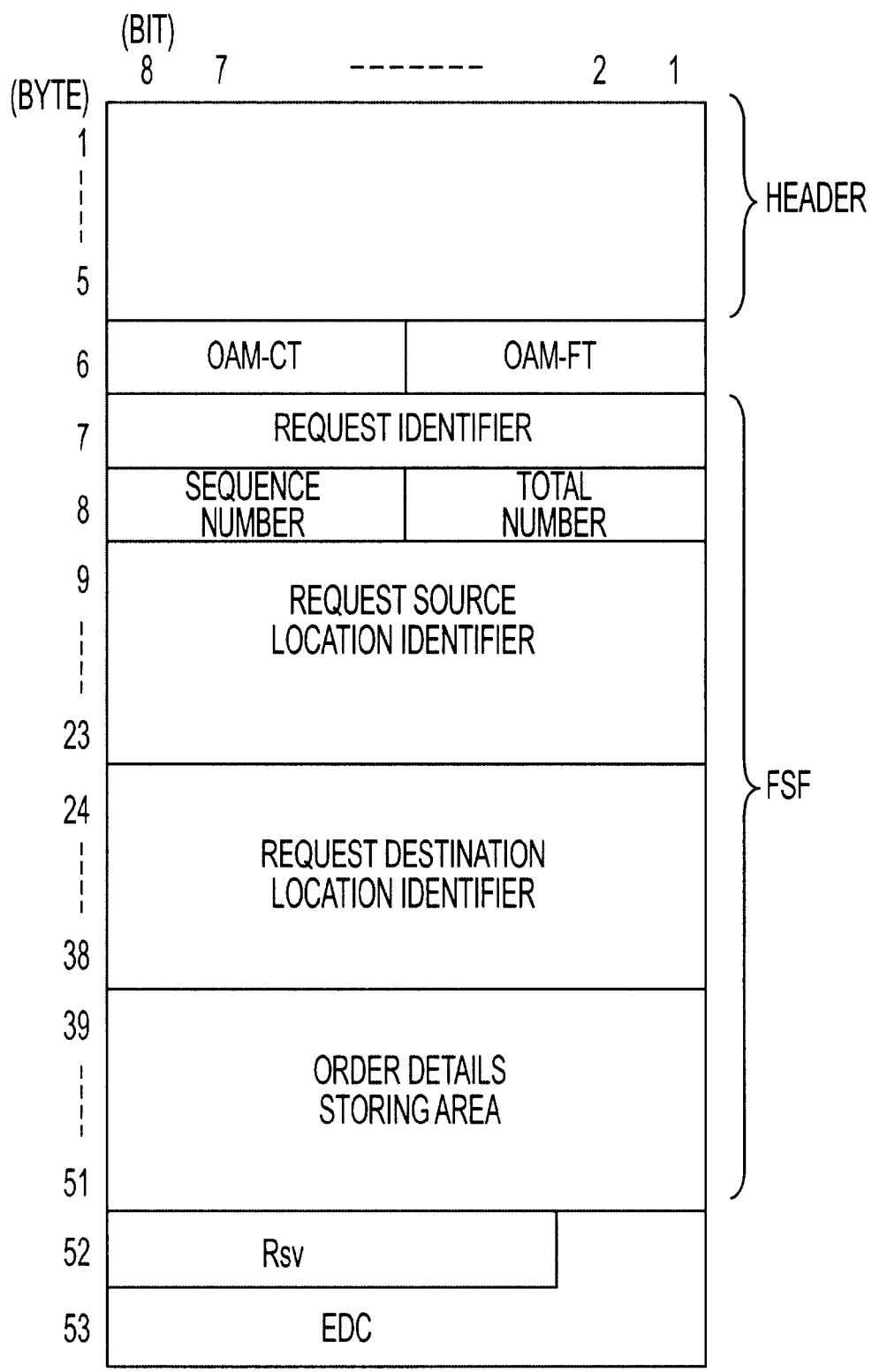
FIG. 4 shows the format of an ODR-OAM cell according to the first aspect of the preferred embodiment of the present invention.

FIG. 4 shows the format of the ODR-OAM cell according to the preferred embodiment of the present invention. The ODR-OAM cell is composed of a 5-byte header and a 48-byte information field. OAM-CT, OAM-FT, Rsv, and EDC, which are included in the information field, are the same as those shown in FIG. 3. A 1-byte request identifier, a 4-bit sequence number, a 4-bit total number, a 15-byte request source location identifier, and a 13-byte order details storing area are included in a 45-byte function specific field FSF.

The numbers of bytes of the request identifier, the sequence number, the total number, the request source location identifier, the request destination location identifier, and the order details storing area, which are included in the function specific field FSF, are not limited to those described above. They may be changed depending on need. Their respective contents are shown in FIG. 5, where the order details storing area is assumed to be 13 bytes. If the number of bytes of the order to be transmitted is large, the order is divided and transmitted. In this case, a sequence number and a total number indicating the number of divisions are assigned to each of the ODR-OAM cells which the order is divided into and are sequentially transmitted.

Figure 6:
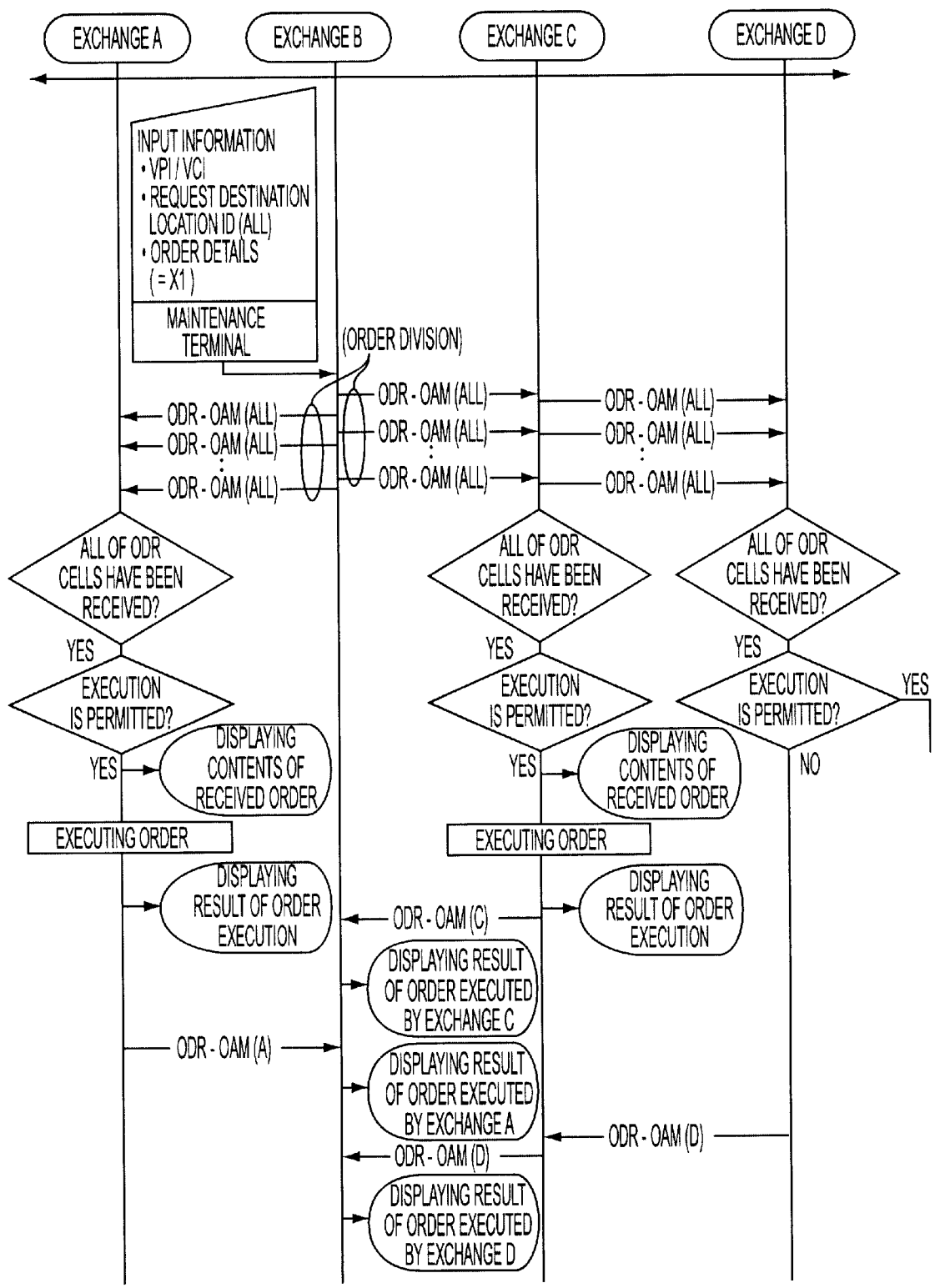
FIG. 6 shows the sequence for transmitting/receiving an order with ODR-OAM cells according to the first aspect of the preferred embodiment of the present invention.

FIG. 6 shows the sequence for transmitting/receiving an order with ODR-OAM cells according to the preferred embodiment of the present invention. This preferred embodiment refers to the case where a network is maintained and managed by transmitting/receiving ODR-OAM cells in the network where VP/VC connections are established between respective exchanges A through D, and an order is transmitted from the exchange B to the other exchanges.

Figure 1:
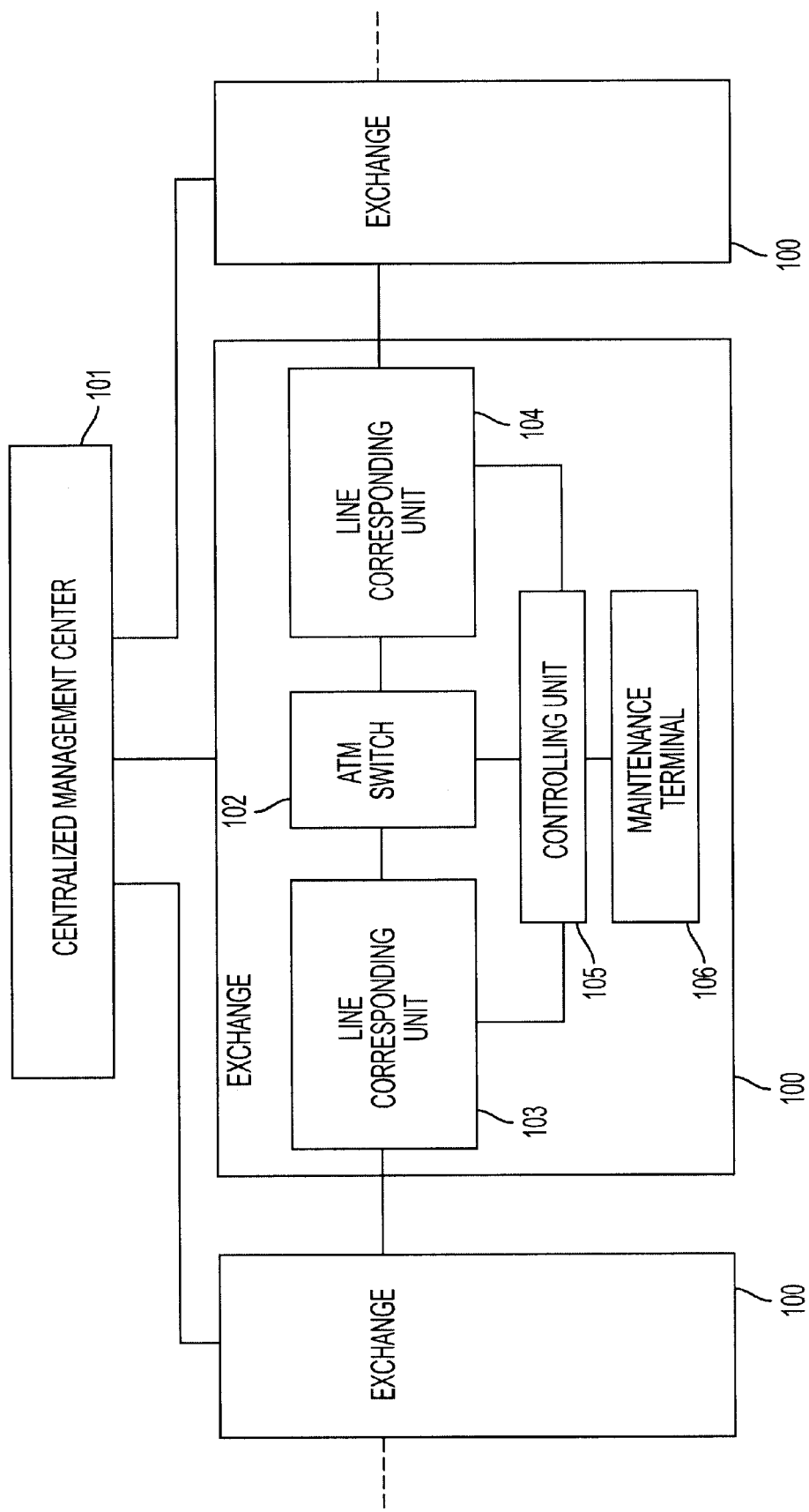
FIG. 1 is a block diagram showing the outline of the configuration of a conventional ATM network.

"ALL" assigned to the VPI/VCI and the request destination location identifier indicates that all of the exchanges are specified from the maintenance terminal 6 (refer to FIG. 1) included in the exchange B. Assuming that "X1" is input as the order details, the order processing unit 5a included in the controlling unit 5 performs an editing operation such as assigning a request identifier, etc., for the order, and transfers the edited order to the line corresponding units 3 and 4. ODR-OAM cells are generated in the cell processing units 3b and 4b, which are respectively included in the line corresponding units 3 and 4. The ODR-OAM cells into which the order is divided are transmitted from the transmitting/receiving units 3a and 4a as the ODR-OAM (ALL).

Each of the exchanges A, C, and D determines whether or not all of the ODR-OAM cells into which the order is divided have been received based on the sequence number and the total number. If all of the cells are determined to have been received, it is further determined whether the execution of the order is either permitted or prohibited. Whether the execution of the order transmitted from a different exchange is either permitted or prohibited in each exchange is set, for example, in an execution permission/prohibition setting table generated in the memory 7 that the controlling unit 5 controls. FIG. 7 exemplifies the execution permission/prohibition setting table.

The execution permission/prohibition setting table shown in FIG. 7 is intended for the exchanges A, C, and D. "0" indicates the permission of the execution, while "x" indicates the prohibition. For example, the execution of an operation for transmitting an order X1 from the exchange B or C is permitted in the exchange A. However, the execution of the operation X1 from the exchange D is prohibited. The execution of operations X2 and X3 are permitted only from the exchange C. Additionally, for the exchange C, the execution of the operation X1 from the exchange A or D is prohibited, but that from the exchange B is permitted. For the exchange D, the execution of the operation X1 is permitted only from the exchange A or C, while that from the exchange B is prohibited.

Since the execution of the operation X1 from the exchange B is set to be permitted for the exchanges A and C in the execution permission/prohibition setting table, the maintenance terminals of the exchanges A and C are made to display the contents of the received order and the request source location identifier. After the operation X1 is performed, the maintenance terminals are made to display the result of the operation X1. At the same time, the result is transmitted to the exchange B with ODR-OAM cells. If the amount of the information of the result is large in this case, also the result is divided and transmitted with ODR-OAM cells. If a conventional network management center and this capability coexist, the information is transferred from the maintenance terminal of the exchange which has performed the operation (the exchanges A and C in this case) to the network management center with a conventional method for notifying a network management center (such as a CMIP method).

Because the execution of the operation X1 from the exchange B is set to be prohibited for the exchange D in the execution permission/prohibition setting table, this execution is determined to be prohibited. Therefore, an ODR-OAM cell indicating "NG" is transmitted to the exchange B.

The exchange B receives the ODR-OAM cells from the exchanges A, C, and D, and makes its maintenance terminal display the respective processing results. As a result, the exchange B makes the other exchanges perform a desired operation, and can verify the result. Assume that a network includes the exchanges of a plurality of common carriers. In this case, the prohibition of execution can be set in the execution permission/prohibition setting table in order to prohibit a response to a particular order such as an accounting information read, etc. between the exchanges of different carriers.

Figure 8:
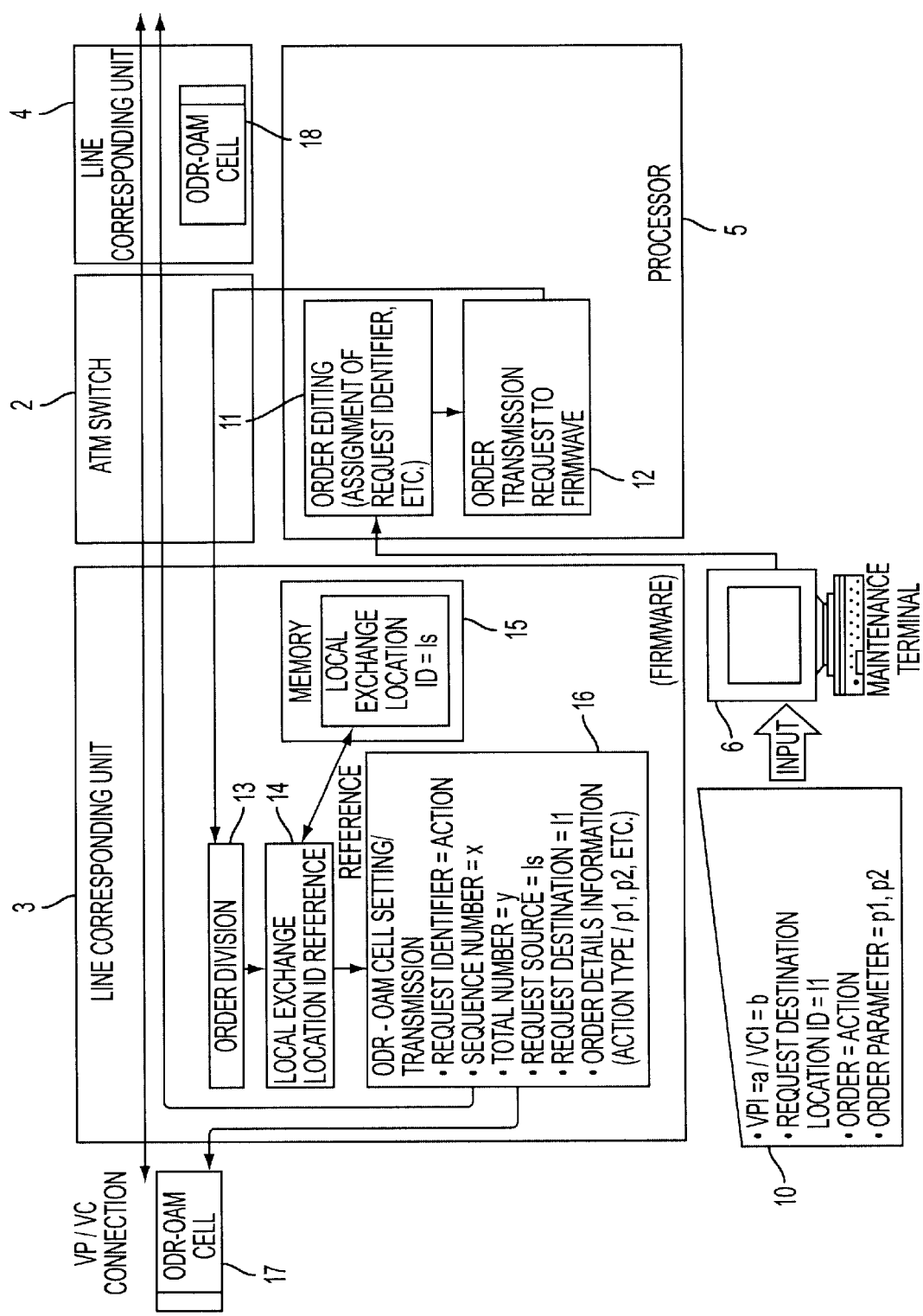
FIG. 8 is a schematic diagram explaining the operations performed when an order is transmitted in the preferred embodiment as a first aspect of the present invention.

FIG. 8 is a schematic diagram explaining the operations performed when an order is transmitted in the preferred embodiment according to the present invention. This preferred embodiment comprises an ATM switch 2, line corresponding units 3 and 4, a processor 5 (corresponding to the controlling unit 5 shown in FIG. 2), and a maintenance terminal 6. Explained below is the case where cells are processed in the line corresponding unit 3 by assigning numerals to the respective steps.

The operations shown in FIG. 8 correspond to the above described operations for transmitting an order, which are performed by the exchange B. First of all, VPI=a and VCI=b of a VP/VC connection, a request destination location identifier (ID)=I1, the order=ACTION (refer to FIG. 5), and order parameters=p1, p2 are input to the maintenance terminal 6 as input information 10.

The processor 5 performs order editing 11 for attaching a request identifier, etc., and makes an order transmission request 11 to the firmware of the line corresponding unit 3. Such a process is performed by the capabilities of the order processing unit 5a included in the controlling unit 5 shown in FIG. 2.

The line corresponding unit 3 performs order division 13 in correspondence with the size of the order details storing area of the ODR-OAM cell according to the order transmission request 11, performs local exchange location identifier (ID) reference 14, that is, reads the local station location identifier (ID)=$I_s$ from the memory 15, and performs ODR=OAM cell generation 16.

Assume that the number of divisions of the order is "y", and the location identifier for all of the exchanges of the VP/VC connection is I1. The ODR-OAM cell where the request identifier=ACTION, the sequence number=x(1, 2, 3, . . . , y), the total number=y, the request source location identifier=$I_s$, the request destination location identifier=I1, and the order details information (p1, p2, etc.) are included in the function specific field FSF, is generated. The generated ODR-OAM cell is transmitted in both of the directions of the VP/VC connection as ODR-OAM cells 17 and 18.

Figure 9:
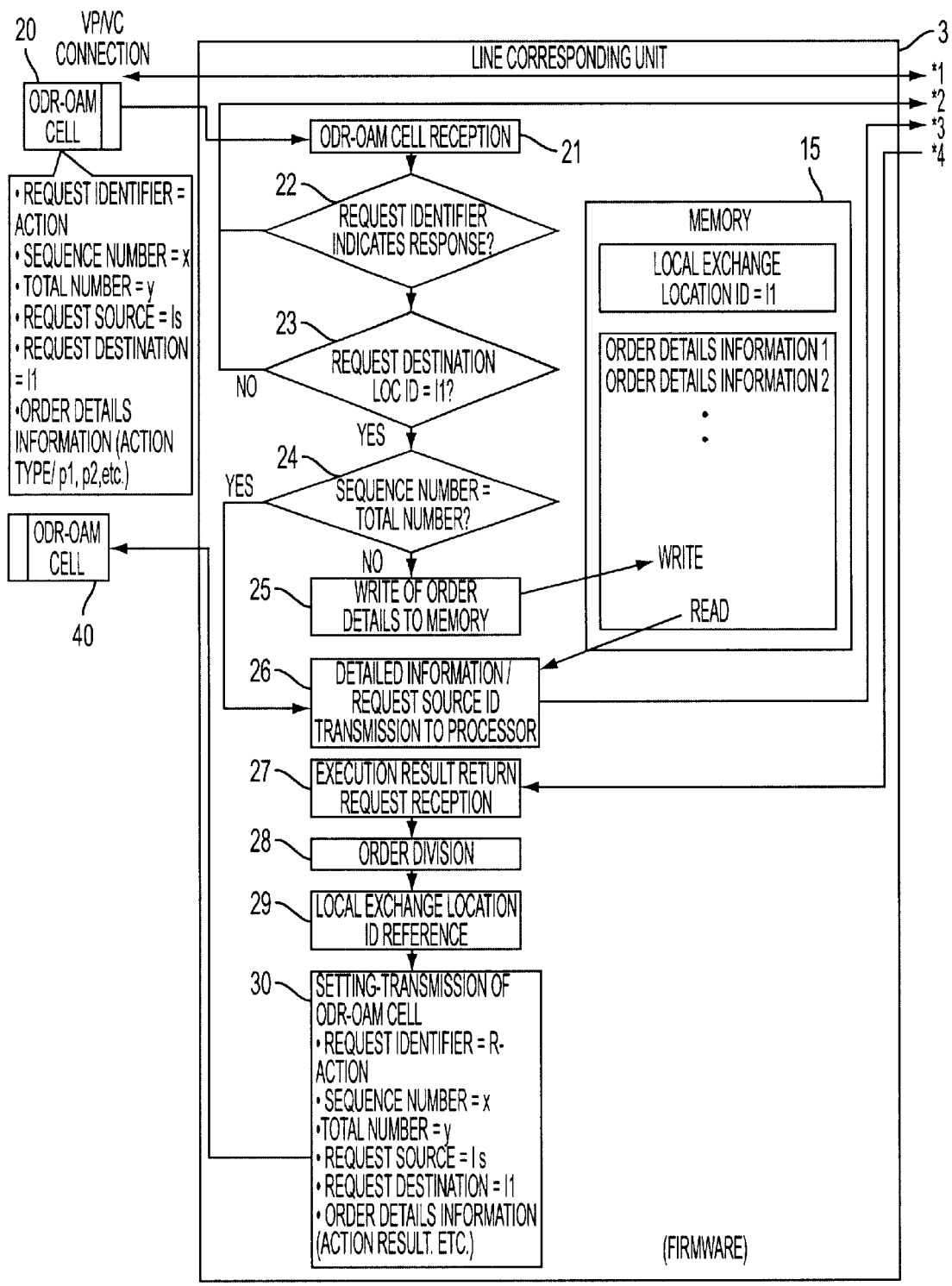
FIG. 9 is a flowchart explaining the operations performed when the order is received in the preferred embodiment as the first aspect of the present invention (No. 1)
Figure 10:
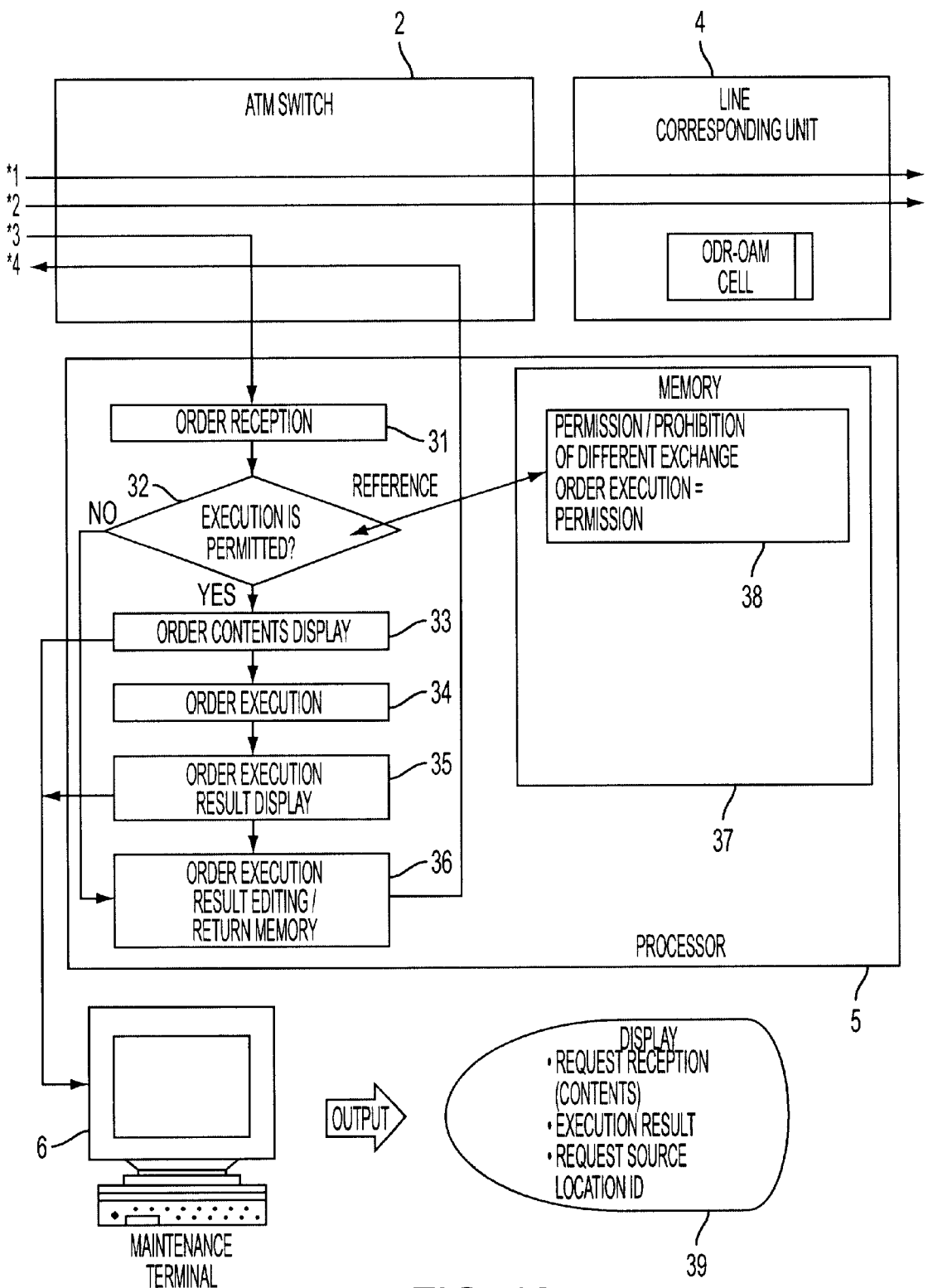
FIG. 10 is a flowchart explaining the operations performed when the order is received in the preferred embodiment as the first aspect of the present invention (No. 2)

FIGS. 9 and 10 are flowcharts explaining the operations performed when an order is received in the preferred embodiment according to the present invention. The same reference numerals as those shown in FIGS. 2 and 8 denote the same portions. These figures show the operations corresponding to those performed by the exchanges A, C, and D, which receive an order from the exchange B shown in FIG. 6. The firmware of the line corresponding unit 3 performs a reception process 21 for the above described ODR-OAM cell 20 where the request identifier=ACTION, the sequence number=x, the total number=y, the request source location identifier=$I_s$, the request destination location identifier=I1, and the order details information (p1, p2, etc.) are included in the function specific field FSF.

Then, the determination 22 of whether or not the request identifier is a response is made. If the request identifier is a response, and, for example, if the request identifier is the response to the orders such as "R-ACTION", "R-CREATE", "R-DELETE", "R-SET", "R-GET" (refer to FIG. 5), etc., the received ODR-OAM cell is transmitted via the ATM switch 2 and the line corresponding unit 4. If the request identifier is not a response, and, for example, if the request identifier indicates the orders such as "ACTION", "CREATE", "DELETE", "SET", "GET", etc., the determination 23 of whether or not the request destination location identifier (LOC ID) is "I1" is made. That is, the determination is made by referencing the local exchange location identifier (ID)=I1, which is stored in the memory 15.

If the request destination location identifier and the local exchange location identifier do not match, the received ODR-OAM cell is not addressed to the local exchange itself. Therefore, the received ODR-OAM cell is transmitted via the ATM switch 2 and the line corresponding unit 4. If the request destination location identifier and the local exchange location identifier match, the received ODR-OAM cell is addressed to the local exchange itself. Accordingly, the determination 24 of whether or not the sequence number is equal to the total number is made. That is, it is determined whether or not x=y. If "x" is not equal to "y", a write 25 of the details of the order is made to the memory 15. If "x" is equal to "y", a transmission 26 of the order details information read from the memory 15 and the request source location identifier (LOC ID) is made to the processor 5.

The processor 5 performs an order reception 31, and makes the determination 32 of whether the execution of the order is either permitted or prohibited. Namely, the permission/prohibition of execution of an order from a different exchange is set in an execution permission/prohibition setting table 38 generated in the memory 37. If the order from the exchange B is set to be permitted, the processor 5 makes the maintenance terminal 6 perform an order contents display 33 and order execution 34 similar to the exchanges A and C shown in FIG. 6. Additionally, the processor 5 makes the maintenance terminal 6 perform an order execution result display 35, and transmits the execution result to the firmware of the line corresponding unit 3 with the capability of an order execution result editing/return 36.

Accordingly, the maintenance terminal 6 can perform a display 39 of, for example, received request contents, an execution result, a request source location identifier (ID), etc. In this way, the reception of an order from a different exchange, the result of the execution of the order, and the request source can be recognized according to the contents of the display.

If the execution of the order from the exchange B is set to be prohibited in the execution permission/prohibition setting table 38 like the exchange D shown in FIG. 6, the execution of the received order is prohibited. Therefore, this is notified to the capability of the order execution result editing/return 36. This capability of the order execution result editing/return 36 notifies the firmware of the line corresponding unit 3 of the order execution result or the order execution prohibition.

This firmware performs order division 28 after an execution result return request reception 27, and makes reference 29 to the local exchange location identifier (ID), that is, reads the local exchange location identifier (ID)=I1 stored in the memory 15. If the received cell is an ODR-OAM cell responding to the above described request identifier=ACTION, the firmware performs generation 30 of the ODR-OAM cell which includes the request identifier=R-ACTION (refer to FIG. 4), the sequence number (No)=x, the total number=y, the request source location identifier (ID)=$I_s$, the request destination location identifier (ID)=I1, and the order details information such as the action result, etc. The firmware then transmits the generated ODR-OAM cell 40 to the request source exchange indicated by the request source location identifier.

Figure 11:
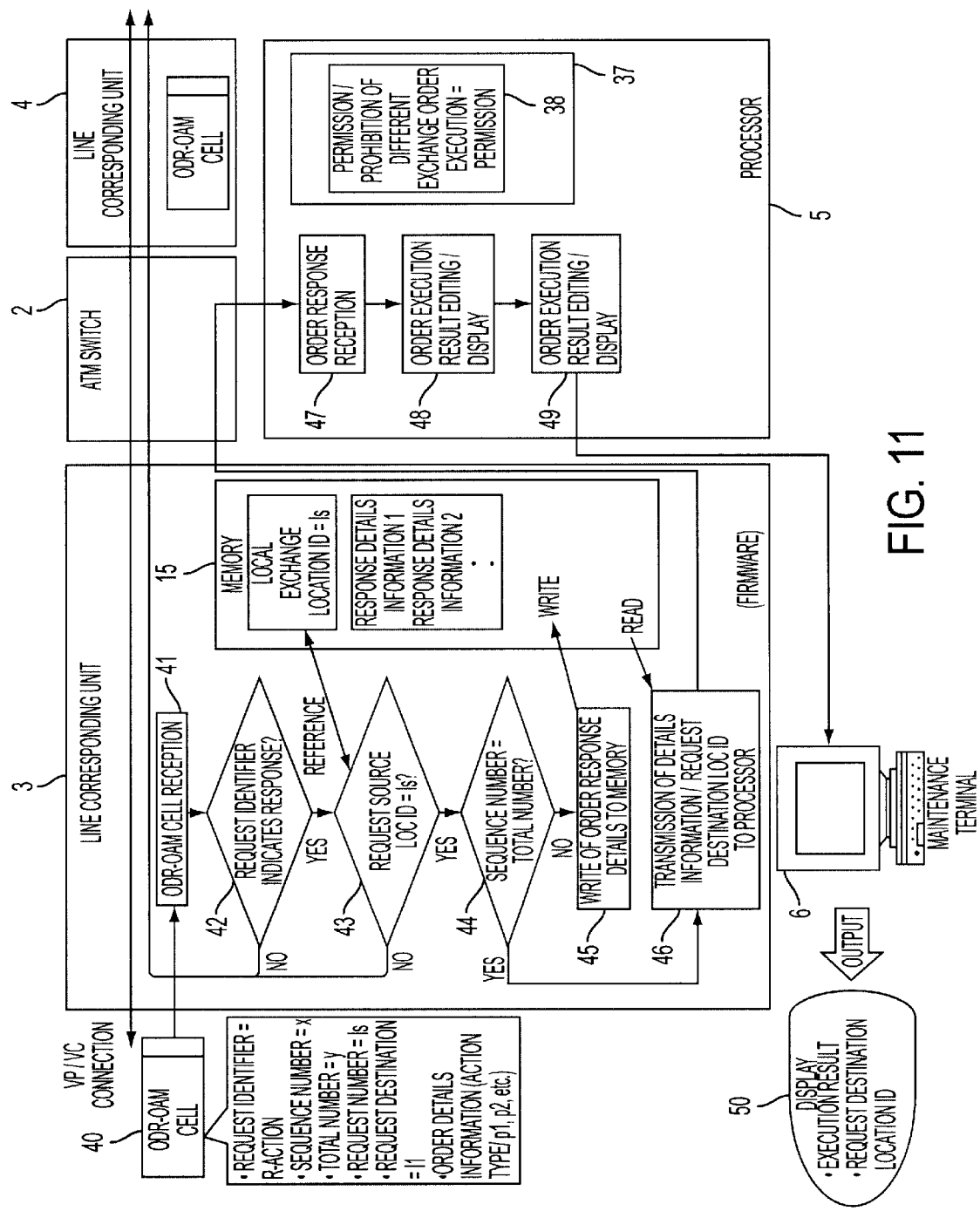
FIG. 11 is a flowchart explaining the operations performed when a response is received in the preferred embodiment as the first aspect of the present invention.

FIG. 11 is a flowchart showing the operations performed when a response is received in the preferred embodiment according to the present invention. The same reference numerals as those used in the above described examples denote the same portions. The firmware of the line corresponding unit 3 performs the reception 41 of the ODR-OAM cell 40, and makes the determination 42 of whether or not the request identifier is a response. Since the request identifier=R-ACTION, which indicates a response, in this case, the firmware further makes the determination 43 of whether or not the request source location identifier (LOC ID)=$I_s$ and the local exchange location identifier match. Namely, the firmware makes this determination 43 by referencing the local exchange location identifier (ID)=$I_s$, which is stored in the memory 15.

If the received ODR-OAM cell is not a response, or if it does not match the local exchange location identifier, this ODR-OAM cell is transferred to the next exchange. If the request identifier indicates the response, and if the request source location identifier and the local exchange location identifier match, the firmware makes the determination 44 of whether or not the sequence number is equal to the total number. If x<y, the firmware makes a write 45 of the details of the order response to the memory 15. If x=y, the reception of the ODR-OAM cells into which the order is divided is completed. Therefore, the firmware of the line corresponding unit 3 makes a transmission 46 of the order details information/request destination location identifier (LOC ID), which are read from the memory 15, to the processor 5.

The processor 5 performs an order response reception 47, and order execution result editing 48. The processor 5 then instructs the maintenance terminal 6 to perform an editing result display 49. As a result, the maintenance terminal 6 performs a display 50 of the execution result and the request destination location identifier (ID).

As described above, it is possible to make a different exchange perform operations similar to those of a local exchange by using ODR-OAM cells. For example, the operations include (1) a PVC establishment/release/change/read operation, (2) a device state change/read operation, (3) a device diagnostic operation, (4) a file backup/file information read operation, (5) a patch file entry/read operation, (6) a traffic information/performance information read operation; (7) an occurred alarm read operation; (8) a cell continuity test; (9) time information setting, etc.

Figure 12:
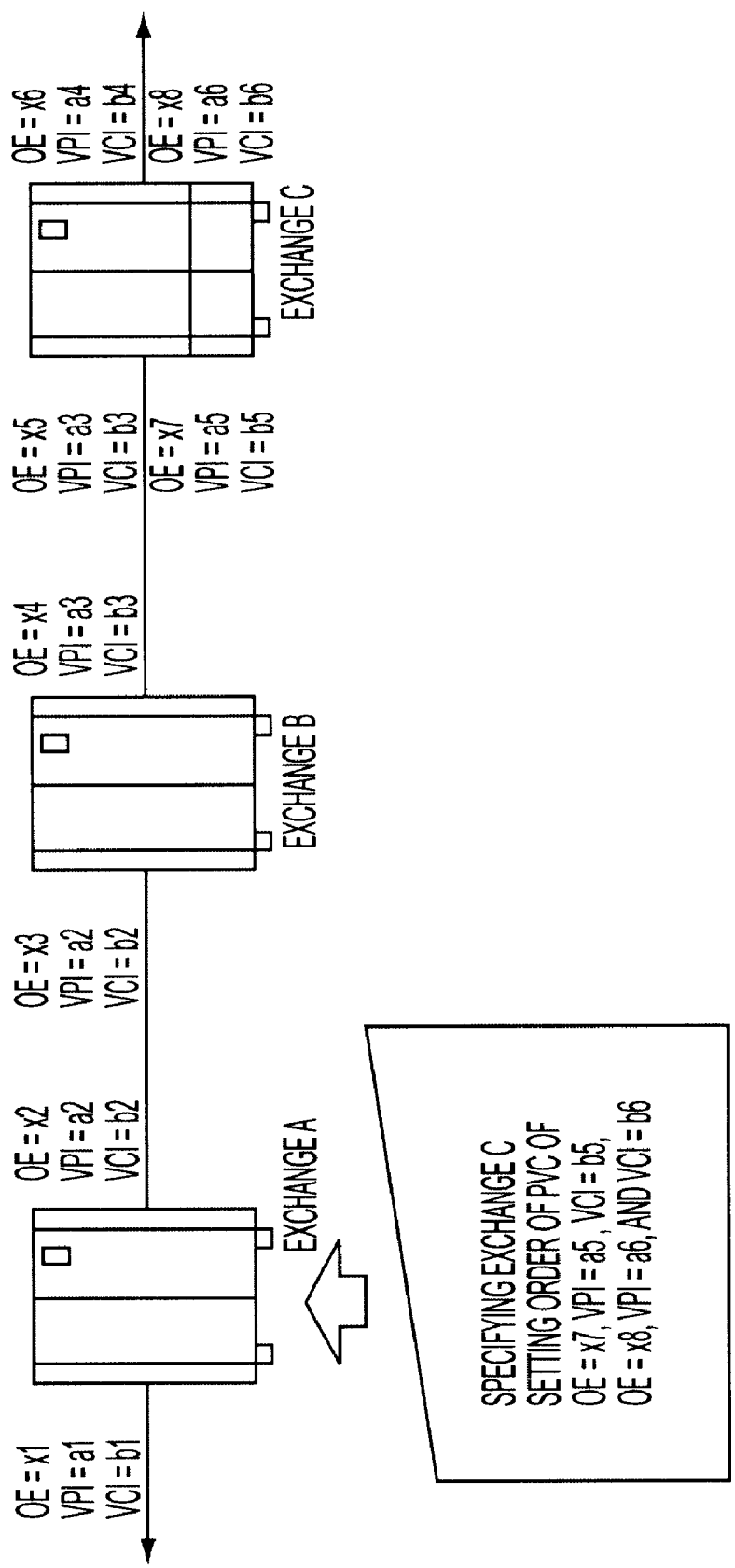
FIG. 12 is a schematic diagram explaining the operations for establishing a path of a different station with ODR-OAM cells in the preferred embodiment as the first aspect of the present invention.
Figure 13:
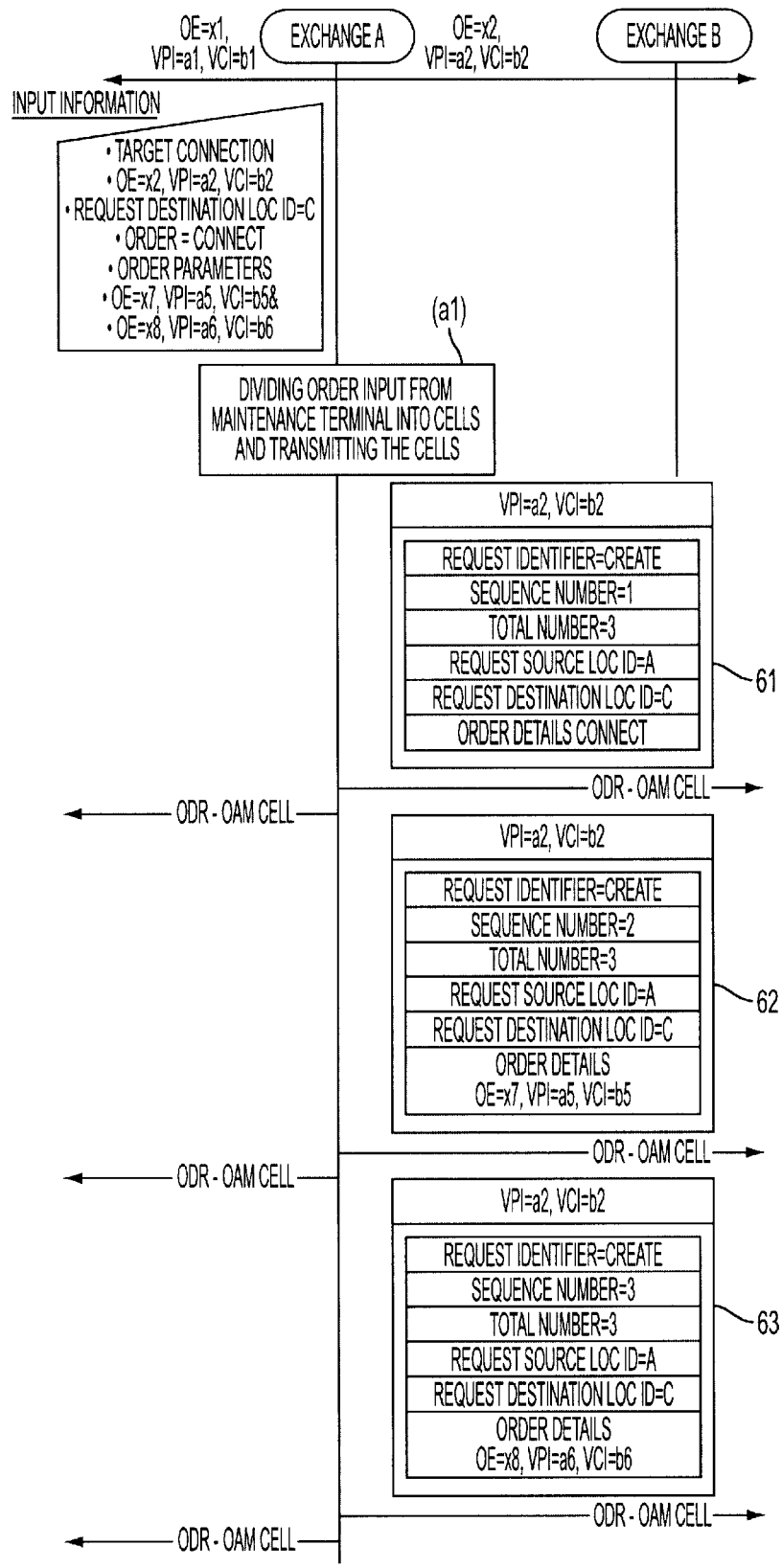
FIG. 13 shows the sequence when the path of the different station is established in the preferred embodiment as the first aspect of the present invention (No. 1)
Figure 14:
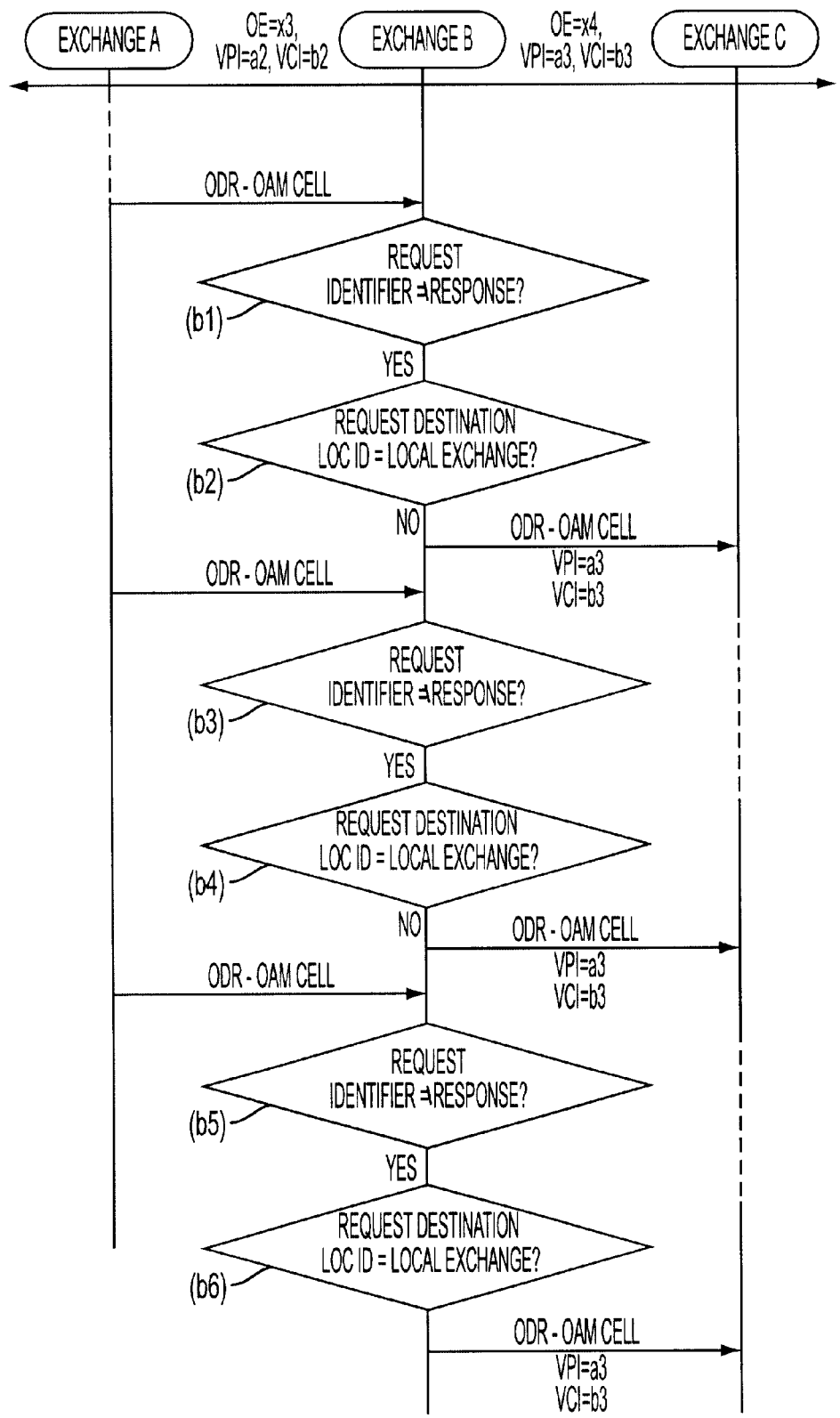
FIG. 14 shows the sequence when the path of the different station is established in the preferred embodiment as the first aspect of the present invention (No. 2)
Figure 15:
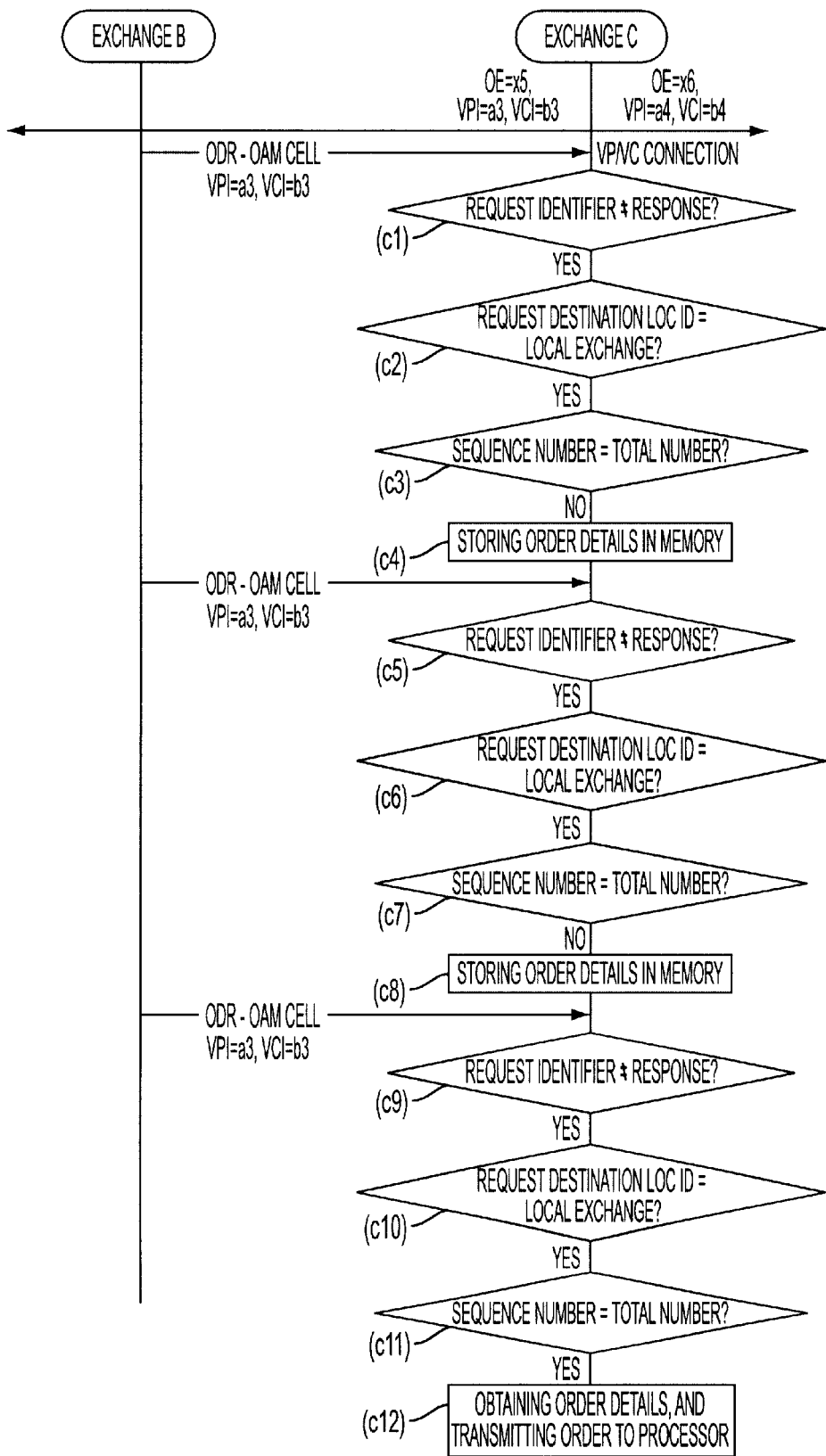
FIG. 15 shows the sequence when the path of the different station is established in the preferred embodiment as the first aspect of the present invention (No. 3)
Figure 16:
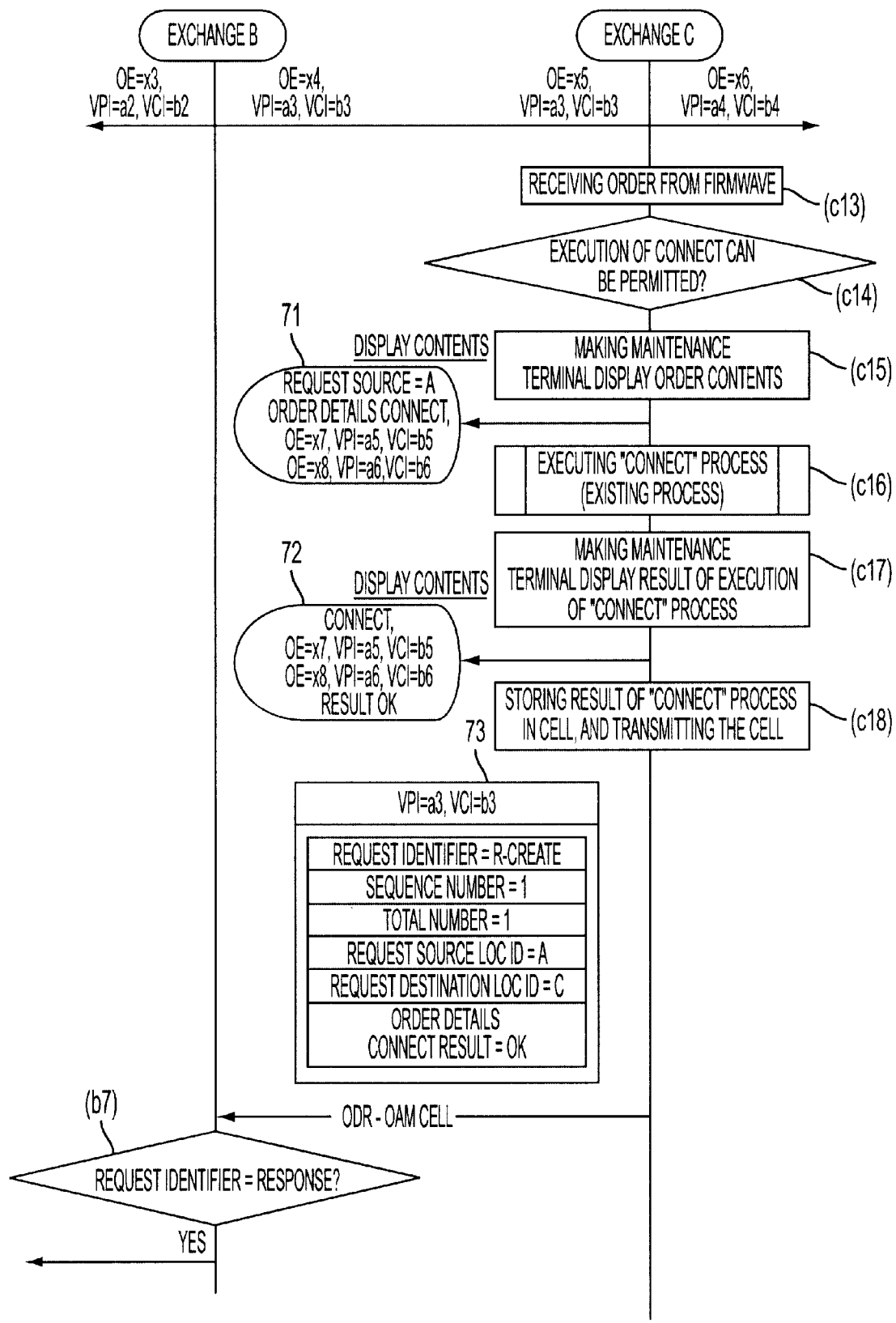
FIG. 16 shows the sequence when the path of the different station is established in the preferred embodiment as the first aspect of the present invention (No. 4)
Figure 17:
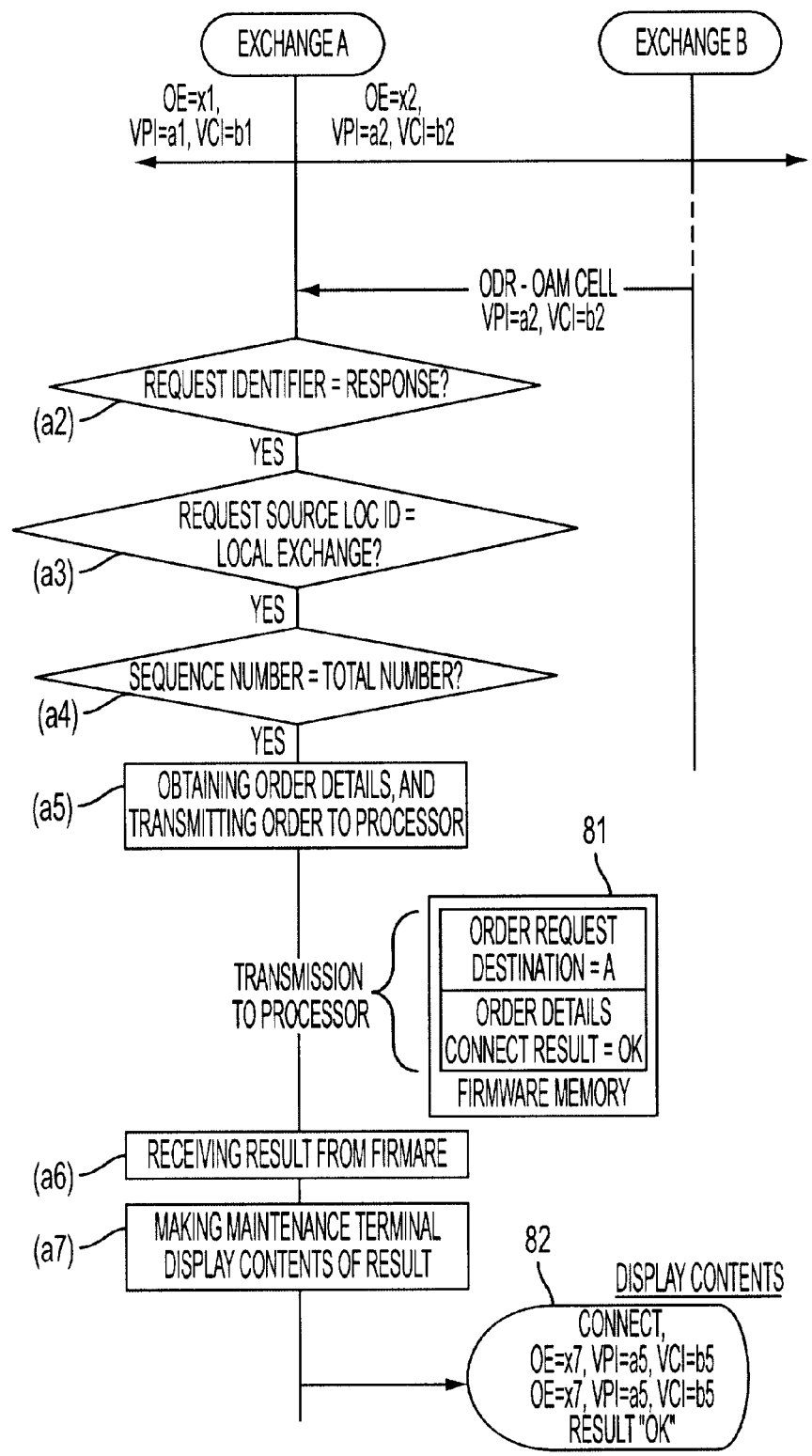
FIG. 17 shows the sequence when the path of the different station is established in the preferred embodiment as the first aspect of the present invention (No. 5)

FIG. 12 is a schematic diagram explaining the operations for setting up the path of a different exchange by using ODR-OAM cells according to the preferred embodiment of the present invention. This figure shows the case where the path is set up from an exchange A to an exchange C. "OE" indicates the physical accommodation position of a line corresponding unit. A "VPI" indicates a virtual path identifier. A "VCI" indicates a virtual channel identifier. The PVC from the exchange A to the exchange C is uniquely determined based on the OE, the VPI, and the VCI. For example, the PVC is defined based on "OE=x2", "VPI=a2", and "VCI=b2". The PVC from the exchange C to the exchange A is defined based on "OE=x5", "VPI=a3", and "VCI=b3". Similarly, for the exchange B, the physical accommodation positions, the VPIs, and the VCIs are defined on the sides of the exchanges A and C.

Assuming that a new virtual path is set up from the exchange A to the exchange C, the OE, the VPI, and the VCI of the exchange which opposes the exchange C are passed to the exchange C as parameters. By way of example, the exchange A specifies the exchange C, and transmits the PVC setting order including "OE=x7", "VPI=a5", and "VCI=b5", and "OE=x8", "VPI=a6", and "VCI=b6" with ODR-OAM cells. As a result, the exchange C will newly set up a virtual path, as represented by a thick line.

FIGS. 13 through 17 are schematic diagrams and flowcharts explaining the sequence corresponding to the path setup shown in FIG. 12, and show the case where a path is set up for a different exchange in a network where the VP/VC connections are established between the exchanges A through C as shown in FIG. 12. These figures show the sequence of the exchange A. "OE=x2", "VPI=a2", and "VCI=b2" of the exchange A itself as a target connection, "the request destination location identifier (LOC ID)=C", "the order=CONNECT", and "OE=x7", "VPI=a5", and "VCI=b5", and "OE"=x8", "VPI=a6", and "VCI=b6" as order parameters are input from the maintenance terminal 6 (refer to FIG. 2).

The processor 5 of the exchange A (refer to FIGS. 2 and 8) edits this order, and requests the firmware of the line corresponding unit 3 to transmit the order. The firmware generates ODR-OAM cells by dividing the order in correspondence with the size of the order details storing area, and transmits the generated ODR-OAM cells (a1). This case assumes that the order is divided into three ODR-OAM cells 61, 62, and 63, which will be transmitted. The ODR-OAM cell 61 includes "VPI=a2", "VCI=b2", "the request identifier=CREATE", "the sequence number indicating a transmission order=1", "the total number indicating the number of divisions=3", "the request source location identifier (LOC ID)=A", "the request destination location identifier (LOC ID)=C", and "the divided order details= CONNECT".

The second ODR=OAM cell 62 includes "the sequence number=2", "the divided order details=OE=x7", "VPI=a5", and "VCI=b5". The third ODR-OAM cell 63 includes "the sequence number=3", "the divided order details=OE=x8", "VPI=a6", and "VCI=b6". These ODR-OAM cells are transmitted in both directions.

Since the ODR-OAM cell from the exchange A is addressed to the exchange C, the exchange B relays this cell. Accordingly, the exchange B determines whether or not the request identifier of the ODR-OAM cell from the exchange A indicates a response (b1). Because the request identifier does not indicate a response in this case, the exchange B further determines whether or not the request destination location identifier (LOC ID) and the local exchange location identifier match (b2). The request destination location identifier indicates that the ODR-OAM cell is addressed to the exchange C in this case. Therefore, the exchange B determines that this cell is not addressed to the exchange B itself, and transmits the cell to the exchange C. Similar determinations (b3), (b4), (b5), and (b6) are sequentially made also for the second and third ODR-OAM cells into which the order is divided. These ODR-OAM cells are then transmitted to the exchange C.

The exchange C determines whether or not the request identifier indicates a response upon receipt of each of the ODR-OAM cells (c1). Since the request identifier does not indicate a response in this case, the exchange C further determines whether or not the request destination location identifier (LOC ID) and the local exchange location identifier match (c2). This ODR-OAM cell is addressed to the exchange C itself, the exchange C further determines whether or not the sequence number is equal to the total number (c3). Namely, the exchange C determines whether or not the whole of the divided order is received.

The total number=3 in this case. The sequence number of the first ODR-OAM cell is "1", which is determined not to be equal to the total number. Accordingly, the details of the order of this ODR-OAM cell are stored in a memory (c4).

Because the sequence number of the second ODR-OAM cell is "2", the details of the order are stored in the memory with the determination operations similar to those in the above described steps (c1) through (c4).

The sequence number of the third ODR-OAM cell is "3". Therefore, the sequence number becomes equal to the total number in step (c11) when the determination operations (c9) through (c11) similar to those in the above described steps (c5) through (c7) are performed. In this way, the exchange C determines that the whole of the divided order has been received, and transmits the stored details of the received order to the processor 5 (c12).

The processor 5 of the exchange C determines whether the execution of the order "CONNECT" is either permitted or prohibited by referencing the execution permission/prohibition setting table (c14). If the execution of the order CONNECT from the exchange A is set to be permitted, the processor 5 makes the maintenance terminal 6 display the contents of the order (c15). The contents displayed at that time are: "the request source=A", "the order details= CONNECT", and the order parameters "OE=x7", "VPI= a5", "VCI=b5", and "OE=x8", "VPI=a6", and "VCI=b5".

The processor 5 performs the process for establishing the specified PVC (c16), and makes the maintenance terminal 6 display the result of the process (c17). The displayed contents 72 are: the order details CONNECT, the order parameters "OE=x7", "VPI=a5", and "VCI=b5", and "OE=x8", "VPI=a6", and "VCI=b6", and the result (either OK or NG).

Because this figure shows the case where the PVC is established for the exchange C as shown in FIG. 12, the result will be OK. The processor 5 then transmits the result of the process with an ODR-OAM cell (c18).

The ODR-OAM cell 73 which includes the result of the process and is transmitted from the exchange C is addressed to the exchange A. Therefore, this cell includes "VPI=a3", "VCI=b3", "the request identifier=R-CREATE", "the sequence number=1", "the total number=1", "the request source location identifier (LOC ID)=A", "the request destination location identifier (LOC ID)=C", and "CONNECT RESULT=OK" as the order details. If the amount of the order details information is large, this information is transmitted with a plurality of ODR-OAM cells into which the order is divided.

The exchange B which has received this ODR-OAM cell 73 from the exchange C determines whether or not the request identifier is a response (b7). Since the request identifier indicates the response to the order CREATE in this case, the exchange B changes the VPI/VCI of the header of this ODR-OAM cell 73 to those addressed to the exchange A. That is, the exchange B respectively changes the VPI and the VCI to "a2" and "b2", and transmits the cell. Note that the above described exchange which relays the cell performs the above described process for changing the VPI/VCI to those corresponding to the destination, in a similar manner as in the case where ATM cells are relayed and transmitted.

The exchange A determines whether or not the request identifier of the received ODR-OAM cell indicates a response (a2). Since the request identifier indicates the response in this case as described above, the exchange A further determines whether or not the request source location identifier (LOC ID) indicates the local exchange location identifier (a3). In this case, the received cell is the response to the order that the exchange A itself has transmitted. Therefore, the exchange A next determines whether or not the sequence number is equal to the total number (a4). Because the total number is "1" in this case, the sequence number becomes equal to the total number. The exchange A therefore transmits the order details to the processor 5.

The contents of the transmission 81 to the processor 5 include: "the order request source=A", and the order details "CONNECT RESULT=OK". The processor 5 receives the result of the order process from the firmware of the line corresponding unit 3 (a6), and makes the maintenance terminal 6 display the result. The displayed contents 82 include: the order details "CONNECT", the order parameters "OE=x7", "VPI=a5", and "VCI=b5", and "OE=x8", "VPI=a6", "VCI=b6", and the result "OK".

With the above described processes, the path of a different exchange, for example, the exchange C, can be set up from the exchange A by using ODR-OAM cells. Accordingly, fault isolation, bypass setting, etc. can be performed without needing a centralized management center. Furthermore, the state of a network can be monitored by collecting the information about the state of a different station, etc.

According to the present invention, the whole of an order addressed to a different exchange is transmitted as an ODR-OAM cell in one lump or by being divided as ODR-OAM cells as described above, so that a network can be maintained and managed by controlling the different exchange. As a result, a conventional centralized management center can be eliminated and the initial and operational cost of the network can be reduced.

Additionally, a network can be maintained and managed by making an arbitrary exchange in a network operate as a centralized management center, so that the maintenance and management by remote control can be easily implemented even in a network where a centralized management center does not exist. Therefore, there is an advantage that the maintenance and management under remote control can be easily performed even in a network where no centralized management center exists. Furthermore, since the permission/prohibition of the execution of an order from a different station is set, the execution of a certain order is set to be prohibited. Therefore, it becomes possible, for example, to reject the request for releasing an important path of a local exchange, which is issued from a different exchange, or to prohibit important information of the local exchange from being read.

In an ATM network, an OAM cell is standardized as a cell for exchanging information for network maintenance and management based on the recommendations of the ITU-T.

In a second aspect of the present invention, the version number of an update file to be newly transmitted is notified to a network node (exchange) on a VP/VC link by using an OAM cell. If the version number of the update file is newer than that of the file stored in an exchange, the exchange which has received the OAM cell obtains the new file by using an OAM cell, and uses the new file for updating the file. Provided below is the explanation about the details of a file updating means.

The following three types of OAM cells will be defined in order to identify the version number of a file and to transmit a new file. The areas for an OAM cell type and an OAM capability type are used in order to distinguish from other OAM cells. Values different from the values which are currently used are set in order to distinguish from the OAM cells used for other purposes.

1) OAM cell for identifying the version number of a file (referred to as an FVC-OAM (File Version Check OAM) cell)
2) OAM cell for preparing for the transmission of the version number of a new file (referred to as an FSP-OAM (File Preparing OAM) cell)
3) OAM cell for transmitting a new file (referred to as an FIS-OAM (File Information Send OAM) cell)

Figure 18:
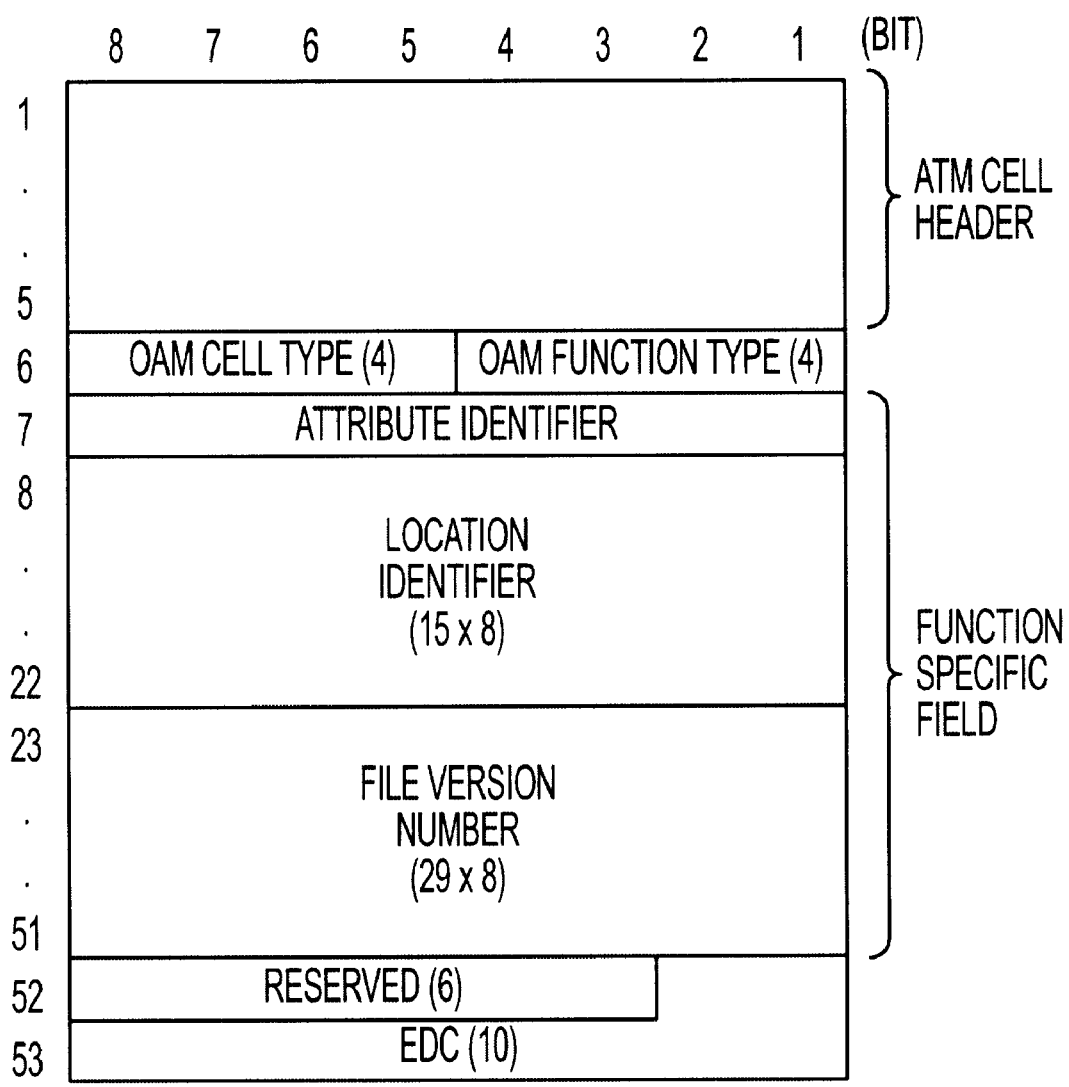
FIG. 18 shows the format of an FVC-OAM cell in a second aspect of the present invention.

FIG. 18 shows the format of the FVC-OAM cell. Table 1 includes the description for respective function specific field types of the FVC-OAM cell.

TABLE 1

| Field | Description |
| --- | --- |
| Attribute Identifier | Field indicating the attribute of a corresponding cell<br>-Version number checking request<br>-version number checking response |
| Location Identifier (LOC ID) | When the version number is checked, the location ID of a source which makes a version number read request is set.<br>When a response is made, the location ID of a response source is set. |
| File Version Number | When the version number checking request is made, the version number of the system file stored in a request source which makes the version number checking request is set.<br>When the version number checking response is made, the version number of the system file after the checking of the version number of each exchange, is set. |

TABLE 1-continued

| Field | Description |
|---|---|
| File Version Number (DL file) | When the version number checking request is made, the version number of the downloaded system (firmware) file stored in a request source, is set. When the version number checking response is made, the version number of the downloaded system file after checking of the version number of an exchange, is set. |

In the attribute identifier field at the beginning of the function specific field, the contents indicating the attribute of the above defined FVC-OAM cell are set. The version number checking request is set when the version number of the file of an ATM exchange at a request destination is inquired. The version number checking response is set, when the version number of the file stored in a local exchange is obtained and the obtained number is returned to the request source of the version number checking request in reply to this request.

The location ID at the request source which makes the version number read request is set in the location identifier field when the version number is checked. The location ID of a response source is set when a response is made. Accordingly, the exchange that has received the FVC-OAM cell identifies the exchange which has transmitted this cell by detecting the location ID.

When the version number checking request is made, the version number of the system file stored in the request source which makes the version number checking request, is set. When the version number checking response is made, the version number of the system file after the checking of the version number of each exchange, is set. Namely, the exchange that has received the FVC-OAM cell for making the version number checking request can read from this field the version number of the file stored in the source that has issued the FVC-OAM cell, and can make a comparison between the read version number and the version number of the file of the exchange itself. The source which has issued this cell can identify the version number of the file stored in each exchange from this field of the FVC-OAM cell received from each station.

Additionally, the file version number field is used for setting the version number of the file of firmware, when only the file of the firmware of a certain exchange is updated. That is, when the version number checking request is made, the version number of the system (firmware) file at the request source is set. When the version number checking response is made, the version number of the downloaded system (firmware) file after the checking of the version number of the exchange, is set.

Figure 19:
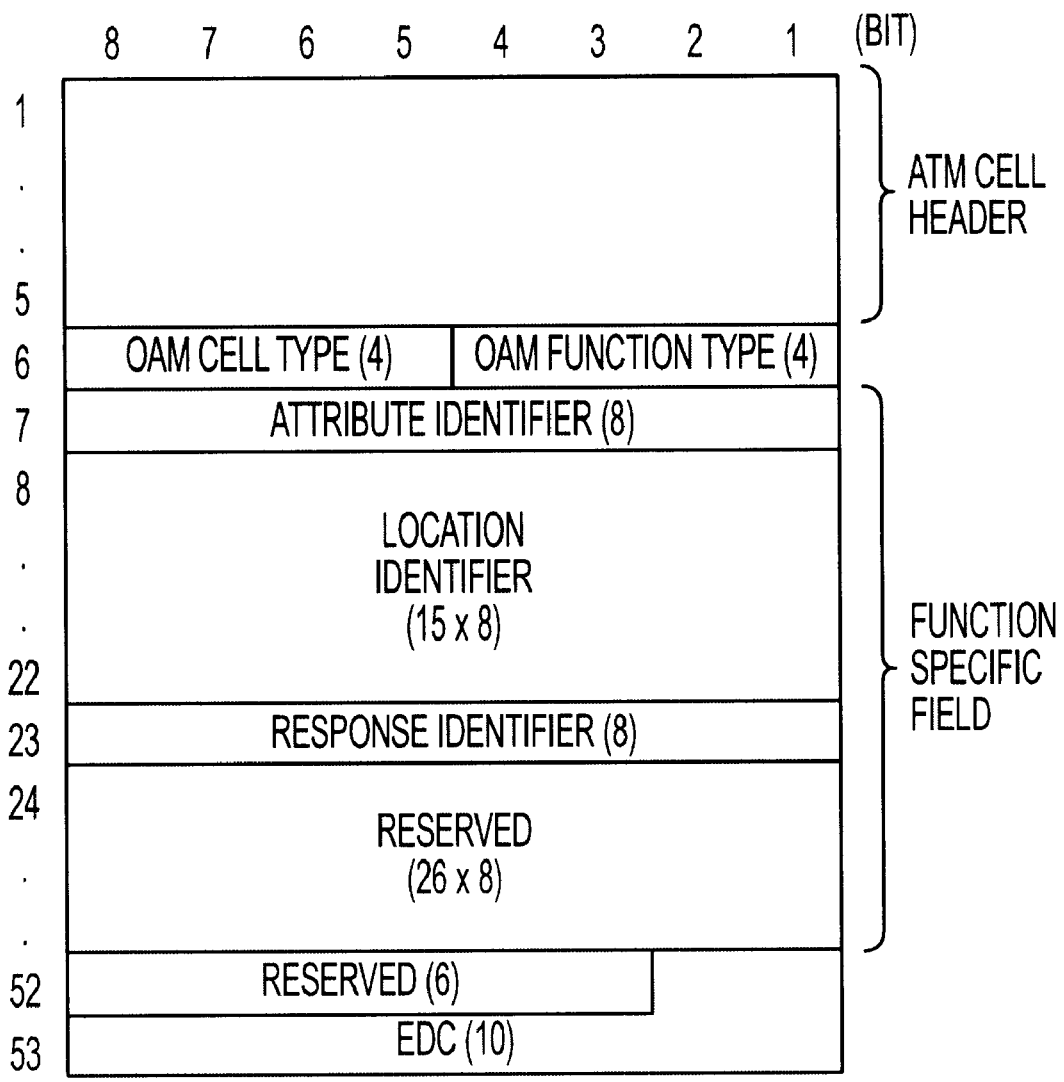
FIG. 19 shows the format of an FSP-OAM cell in the second aspect of the present invention.

FIG. 19 shows the format of the FSP-OAM cell.

Table 2 includes the descriptions of the respective function specific field types of the FSP-OAM cell.

TABLE 2

| Field | Description |
|---|---|
| Attribute Identifier | Field indicating the attribute of a corresponding cell -New file transmission preparation request |

TABLE 2-continued

| Field | Description |
|---|---|
| | -New file transmission preparation response |
| Location Identifier (LOC ID) | When the new file transmission preparation request is made, the location ID of the request source that has make the version number checking request. When a response is made, the location ID of the response source is set. |
| Response Identifier | When a new file reception side becomes ready, "OK" is set for a return. For an exchange which does not update its file, "NG" is set. |

For the FSP-OAM cell, the new file transmission preparation request and the new file transmission preparation response are set in the attribute identifier field. The new file transmission preparation request is intended to instruct a transmission destination exchange to prepare for receiving a file as the file is ready to be transmitted. The new file transmission preparation response is returned to the exchange that has transmitted the new file transmission preparation request, when the file reception preparation is completed according to the new file transmission preparation request made from the exchange which will transmit a new file.

In the location identifier field, the location ID of the request source which has made the version number checking request is set, when the new file transmission preparation request is made. Or, the location ID of a response source is set when a response is made. With this field, the location of the exchange which is ready to transmit a new file, or that of the exchange which has prepared for receiving the file, can be identified.

When the preparation for receiving a new file is completed on a new file receiving side, "OK" is set for a return in the response identifier field. For the station where its file is not updated, "NG" is set. The values assigned to "OK" and "NG" must be suitably set by a person who applies this preferred embodiment.

Figure 20:
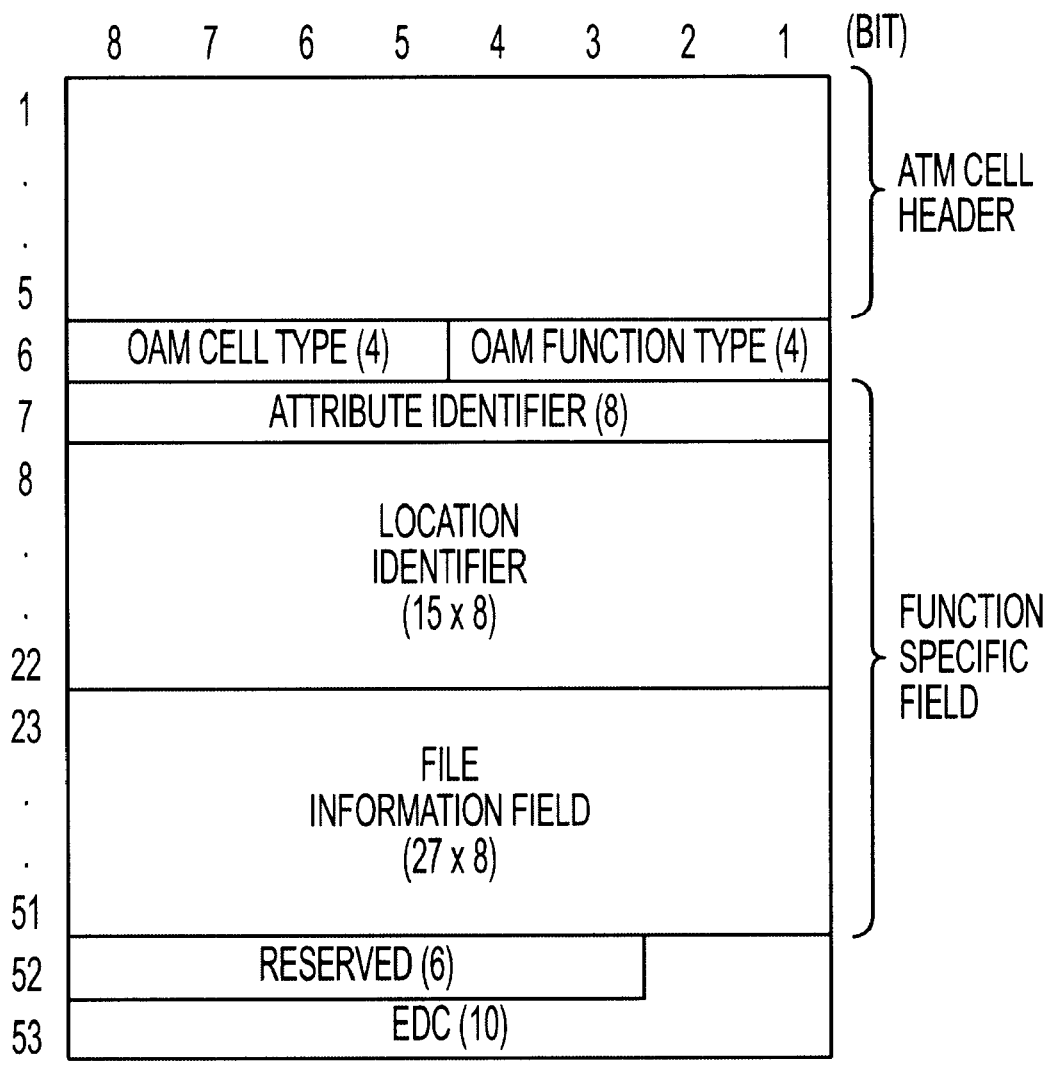
FIG. 20 shows the format of an FIS-OAM cell in the second aspect of the present invention.

FIG. 20 shows the format of the FIS-OAM cell.

Table 3 includes the descriptions of the respective function specific field types of the FIS-OAM cell.

TABLE 3

| Field | Description |
|---|---|
| Attribute Identifier | Field indicating the attribute of a corresponding cell. -A new file transmission -File update completion |
| Location Identifier (LOC ID) | When a new file is transmitted, the location ID of a new file transmission destination is set. When a file update is completed, the location ID of the exchange which has performed the file update is set. |
| File Information Field | A new file is divided and transmitted by using this field. When a file update is completed, whether or not the file update is properly terminated is set. |

In the attribute identifier field of the FIS-OAM cell, the new file transmission and the file update completion are set. The new file transmission is set if the FIS-OAM cell includes a new file as data. The file update completion is set in the exchange which has received a new file and transmitted to the source which has issued the new file, when the file update is completed.

In the location identifier field, the location ID of a new file transmission destination is set when a new file is transmitted. Or, the location ID of the exchange which has performed a file update is set when the file update is completed. Accordingly, the location of the exchange which has transmitted the new file or that of the exchange where the file update has been completed can be identified from the data of this field.

The FIS-OAM cell includes a file information field. This field divides, stores, and transmits a new file. When a file update is completed, it is set whether or not the file update has been properly completed. The size of this cell is fixed. Therefore, when a new file is transmitted, one file is divided into several pieces and stored in the respective file information fields of a plurality of FIS-OAM cells, which will be transmitted to the exchange at a transmission destination.

Figure 21:
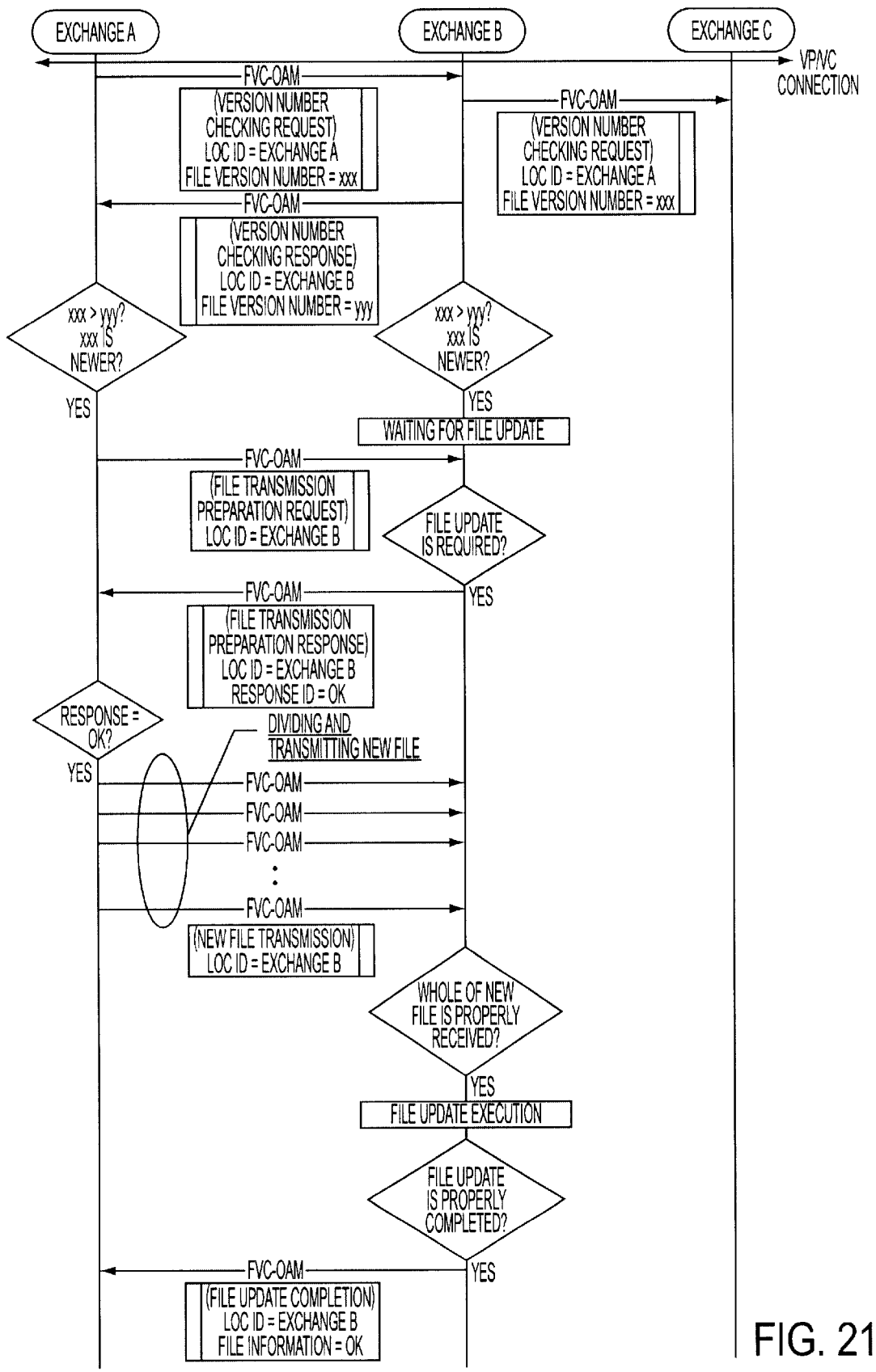
FIG. 21 shows the flow sequence of OAM cells when the OAM cells are used for file update procedures.

FIG. 21 shows the flow sequence of OAM cells when they are used for file update procedures.

Assume that an exchange A shown in this figure is an exchange at a file update request source, while exchanges B and C are exchanges on a VP/VC connection, to which a file update request is made. The exchange A, the request source, may be a local exchange or a centralized management center of exchanges. Here, explanation will be provided by centering on the exchange B.

Upon receiving an FVC-OAM cell (a version number checking request) from the exchange A, the exchange B unchangedly transmits the received FVC-OAM cell to the exchange C in the downstream of the VP/VC connection. For the FVC-OAM cell at this time, the version number checking request is set in the attribute identifier field, the location ID of the exchange A is set in the location identifier field, and the version number of the file that the exchange A is ready to transmit is set in the file version number field.

Next, the file version number and the location ID of the exchange B are set in an FVC-OAM cell (a version number checking response), which is returned to the transmission source. If the received file version number is newer than that of the exchange B itself, the exchange B will enter the state waiting for a file update. If the version number of the file of the exchange B is newer than that of the file transmitted from the transmission source, the exchange B will terminate the process.

The exchange A makes a comparison between the version number of the file transmitted from the exchange B and that of the exchange A itself. If the version number of the file stored in the exchange A is older, the exchange A terminates the process. If the version number of the file stored in the exchange A is newer, the exchange A sets the location ID of the exchange B in the FSP-OAM cell (new file transmission preparation request) upon receipt of the FVC-OAM cell (version number checking response) transmitted from the exchange B, and transmits the cell with the ID set to the exchange B. Upon receiving this cell, the exchange B checks whether or not to perform a preset automatic file update. If "YES", the exchange B sets file update preparation "OK" in the response identifier of the FSP-OAM cell (new file transmission preparation response). If "NO", the exchange B sets "NG" and returns the cell to the exchange A.

Upon receiving the FSP-OAM cell (new file transmission preparation response) from the exchange B, the exchange A reads the response identifier. If the response identifier is "NG", the exchange A terminates the process. If the response identifier is "OK", the exchange A transmits the new file by using FIS-OAM cells (new file transmission). The ID of the exchange B is set in the location identifier, and the new file is divided into file information fields, and is transmitted.

Upon receiving the whole of the new file, the exchange B starts the file update. When the file update is completed, the exchange B transmits its result to the exchange A by using an FIS-OAM cell (file update completion). The process for reconfiguring the file which is transmitted by being divided into a plurality of cells, and for updating the file is stipulated as the standard process of an ATM exchange. The file is reconfigured with the existing standardized process of an ATM exchange in this case.

Provided next is the explanation about the methods for transmitting/receiving the above described OAM cells on an exchange side.

Figure 22:
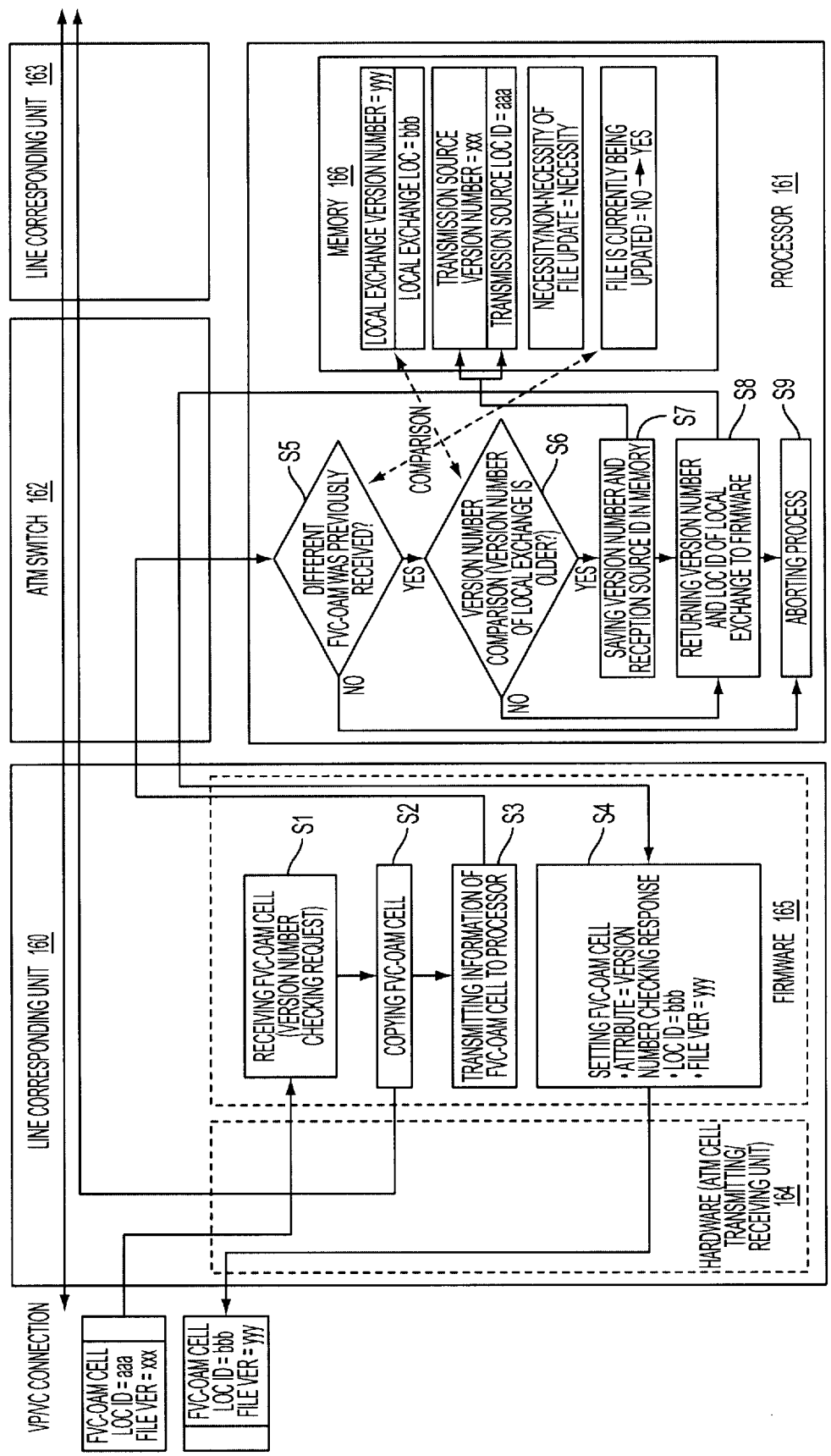
FIG. 22 is a flowchart showing the operations performed by an exchange when the FVC-OAM cell (a version number checking request) is received.

FIG. 22 shows the operations of an ATM exchange when the FVC-OAM cell (version number checking request) is received.

The ATM exchange is composed of line corresponding units 160 and 163, an ATM switch 162, and a processor 161. Each of the line corresponding units 160 and 163 is composed of hardware 164 and firmware 165. The processor 161 includes a memory 166 for storing the version number of the file stored in the exchange itself, etc.

When the line corresponding unit 160 in the ATM exchange receives the FVC-OAM cell (version number checking request) (step S1), the received cell is passed to the firmware 165 (the software installed on the hardware). The firmware 165 copies the received cell, and transmits the copied cell to the ATM switch 162 side (step S2). At the same time, the firmware 165 reads the information (such as the version number, the location ID, etc.) included in the FVC-OAM cell, and transmits the read information to the processor 161 of the exchange (step S3).

The processor 161 checks whether or not a different FVC-OAM cell was previously received (step S5). If the different FVC-OAM cell was previously received, the processor 161 ignores the order to the processor 161, which is included in the received FVC-OAM cell, and terminates the process (step S9). This is because the processor 161 cannot perform the process if a plurality of file update requests are accepted one after the other. If no other FVC-OAM cell was previously received, the processor 161 makes a comparison between the transmitted version number and that of the exchange itself (step S6). If the transmitted version number is newer, the processor 161 stores the transmitted version number and location ID in the memory 166 (step S7). If the version number of the exchange itself is newer as a result of the comparison made in step S6, the processor 161 transmits the version number and location ID of the exchange itself to the firmware 165 of the line corresponding unit 160 in step S8. The firmware 165 sets the version number and the location ID in the FVC-OAM cell (version number checking response), and transmits the cell to the transmission source (step S4).

Described above are the operations that the ATM exchange performs upon receiving the FVC-OAM cell.

Figure 23:
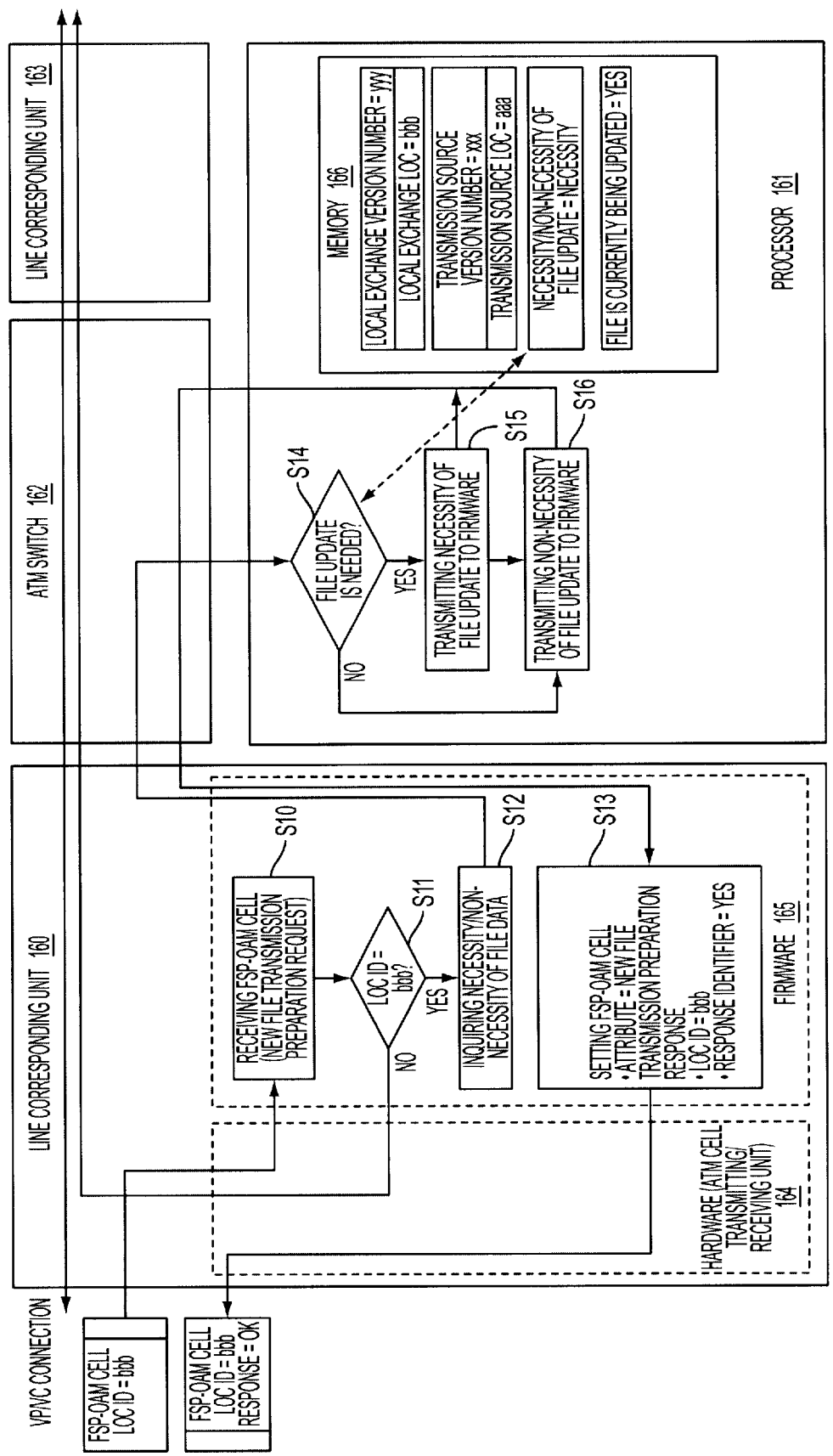
FIG. 23 is a flowchart showing the operations performed by the exchange when the FSP-OAM cell (a new file transmission preparation request) is received.

FIG. 23 is a flowchart showing the operations of the exchange upon receipt of the FSP-OAM cell (new file transmission preparation request).

The same constituent elements shown in FIG. 23 as those shown in FIG. 22 are denoted by the same reference numerals.

Upon receiving the FSP-OAM cell (new file transmission preparation request) (step S10), the line corresponding unit 160 examines the location ID and determines whether or not this cell is addressed to the exchange itself (step S11). If the cell is not addressed to the exchange itself, the line corresponding unit 160 transmits a copied FSP-OAM cell to the exchange in the downstream. If the cell is addressed to the exchange itself, the firmware 165 inquires of the processor 161 whether or not a file update is needed (step S12). The necessity/non-necessity of the file update is preset in the memory 166 with a maintenance operation. Therefore, whether or not the file update is needed is determined according to the preset value by the processor 161 (step S14). If the file update is determined not to be needed, the processor 161 sets "file update not needed" in the response identifier, and transmits the cell to the firmware 165. If the file update is determined to be needed, the processor 161 sets "file update needed" in the response identifier, and returns the cell to the firmware 165 (step S15). The firmware 165 generates the FSP-OAM cell (new file transmission preparation response) where the response identifier from the processor 161 is set, and returns the generated cell to the transmission source (step S10).

Figure 24:
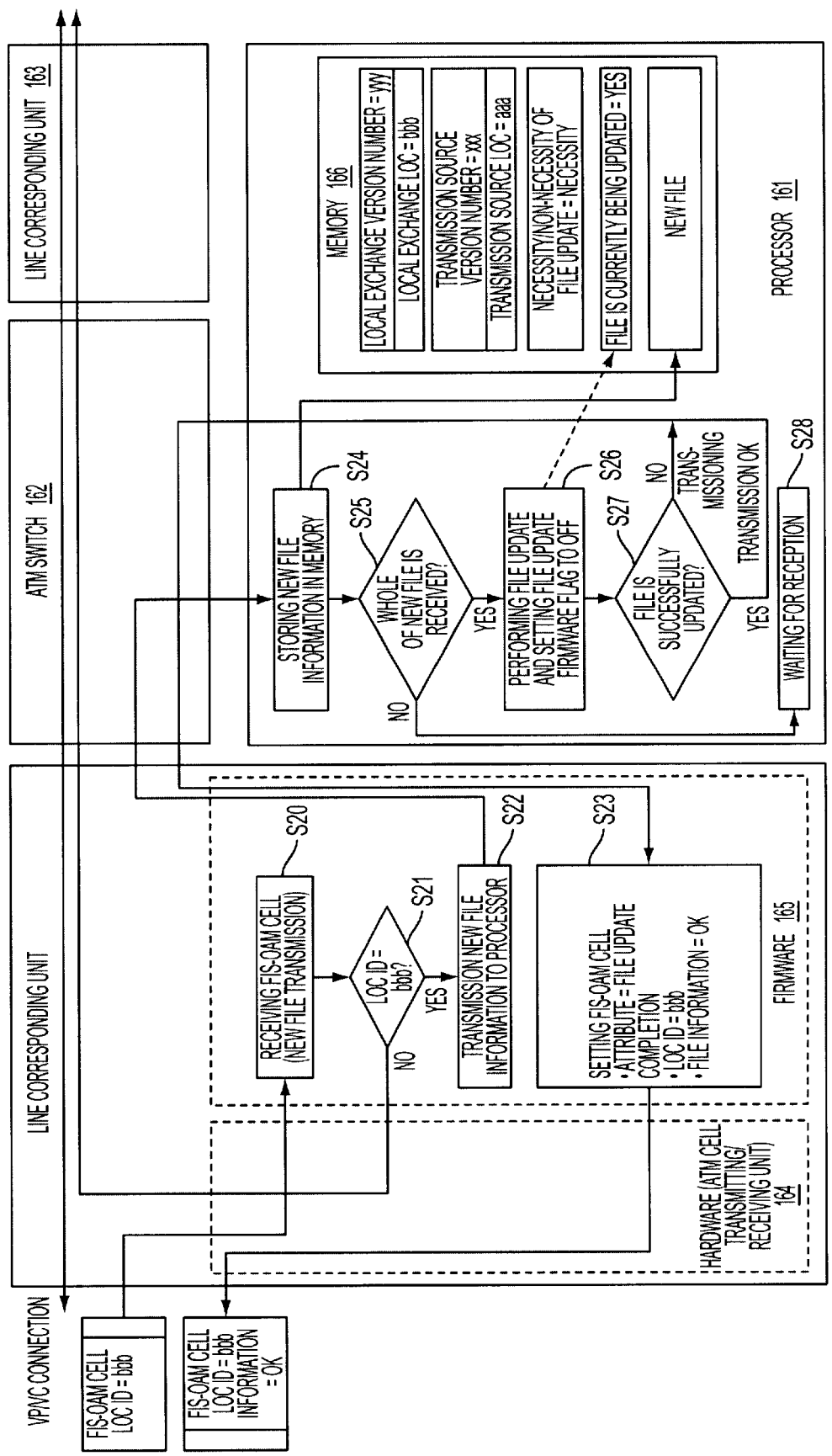
FIG. 24 is a flowchart showing the operations performed by the exchange when the FIS-OAM cell (a new file transmission) is received.

FIG. 24 is a flowchart showing the operations of the exchange when the FIS-OAM cell (new file transmission) is received.

The same constituent elements shown in this figure as those shown in FIG. 22 are denoted by the same reference numerals.

When the line corresponding unit 160 receives the FIS-OAM cell (new file transmission) (step S20), the firmware 165 checks the location ID included in the cell (step S21). If the location ID indicates the exchange itself, the firmware 165 transmits the contents of the file information field to the processor 161. The processor 161 stores the divided file in the memory 166 (step S24), and waits for the completion of the transmission of the whole of the file (steps S25 and S28). The properness of the information of the transmitted file is secured by an upper layer (AAL layer: ATM Adaptation layer) of an ATM transmission. After the processor 161 properly receives the whole of the information of the file, it performs the file update (step S26). The file update is intended for the firmware of speech path equipment as well as the processor 161. The processor 161 then determines whether or not all files have been properly updated (step S27). The processor 161 notifies the firmware 165 of the line corresponding unit 160 of the result, and returns the FIS-OAM cell (file update completion) to the transmission source.

The present invention is applied to an ATM network, so that a centralized management center of exchanges or a certain exchange can remotely check the version number of a file. Additionally, a new file can be distributed to the exchange whose file must be updated by using a virtual path of the ATM network.

Figure 25:
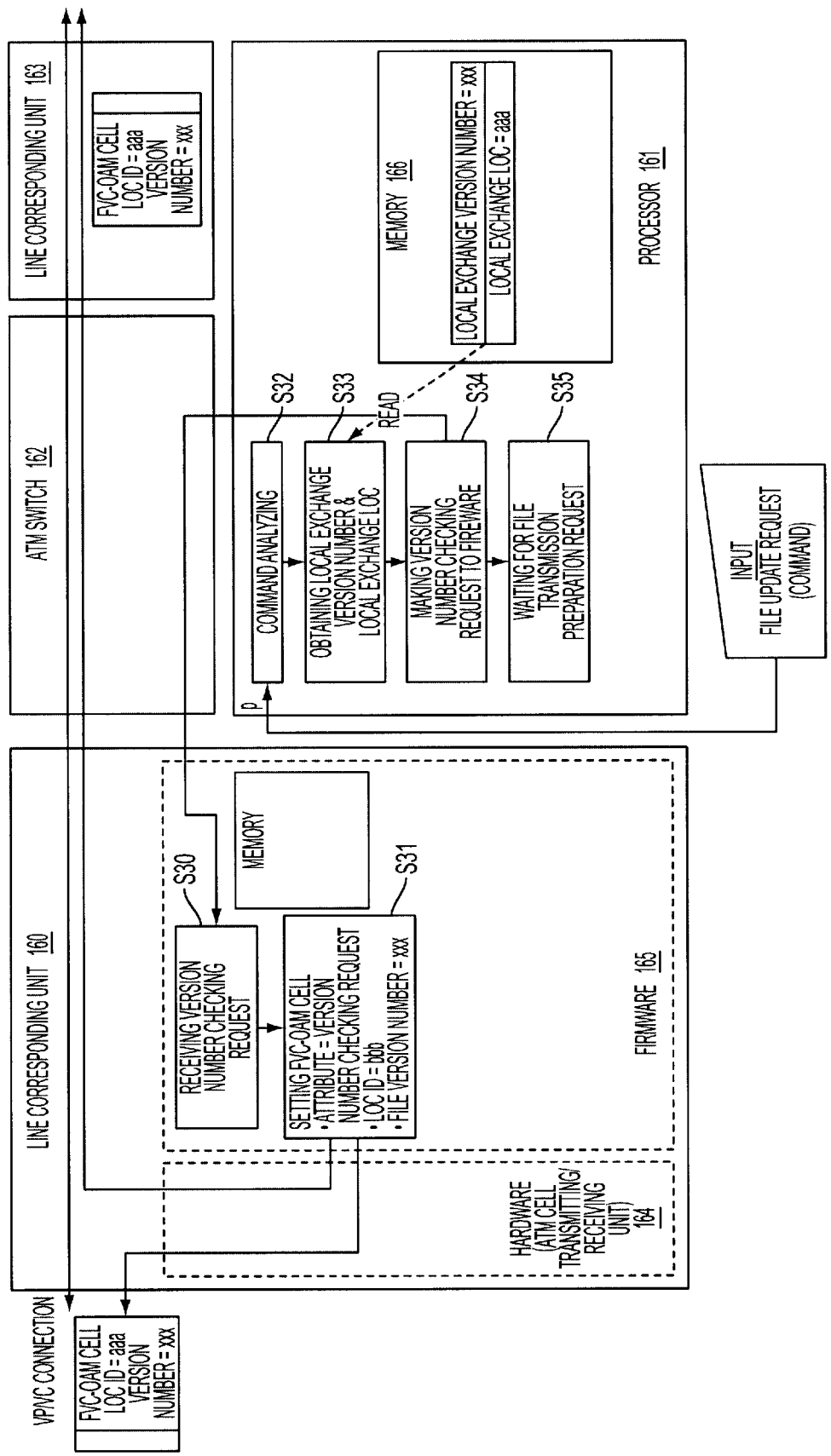
FIG. 25 is a flowchart showing the operations performed by the exchange when a file update request source issues a file update request to another exchange.

FIG. 25 is a flowchart showing the operations of an exchange when a file update request source issues a file update request to a different exchange.

Because the configuration of the exchange is basically the same as that of the file update request destination, the same constituent elements as those shown in FIG. 6 are denoted by the same reference numerals.

The timing at which a file update is performed for a different exchange is provided by a command input by a maintenance engineer, etc. Upon receiving the command input by the maintenance engineer, the processor 161 analyzes the input command (step S32), determines that the input command is a request for updating the file of a different exchange, and invokes the program for updating a file. With the program for updating the file of a different exchange, the version number and location ID of the local exchange, which are stored in the memory 166 of the processor 161, are obtained (step S33). After transmitting these items of information to the firmware 165 of the line corresponding unit 160 (step S34), the processor 161 enters the state waiting for a file update preparation request (step S35).

The firmware 165 which has received the version number checking request (step S30) generates an FVC-OAM cell based on the received information, and transmits the generated cell to both of the upstream and downstream of the corresponding VP/VC link via the hardware 164 (step S31).

Figure 26:
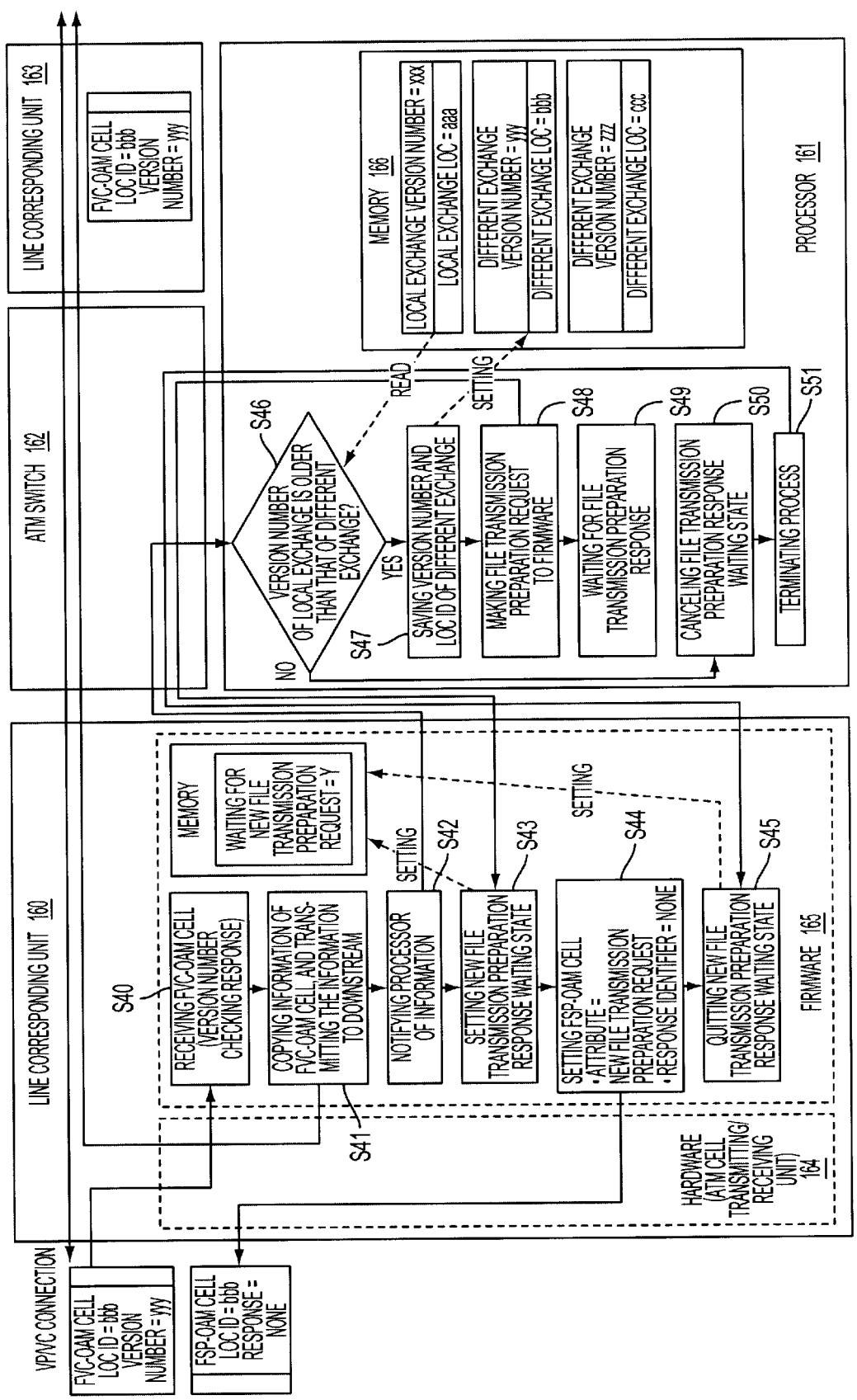
FIG. 26 is a flowchart showing the operations performed by the exchange when the file update request source receives the FVC-OAM cell (a version number checking response) is received.

FIG. 26 is a flowchart showing the operations of an exchange when a file update request source receives the FVC-OAM cell (version number checking response).

The same constituent elements shown in this figure as those shown in FIG. 25 are denoted by the same reference numerals.

Upon receiving the FVC-OAM cell (step S40), the hardware 164 of the line corresponding unit 160 copies the received cell, and transmits the copied cell to the downstream of the VP/VC link (step S41). The firmware 165 transmits the information of the FVC-OAM cell to the processor 161 (step S42).

The processor 161 which has received the version number from a different exchange makes a comparison between the received version number and the version number of the local exchange, and determines whether the version number of the different exchange is either newer or identical (step S46). If the version number of the different exchange is determined to be newer or identical, the processor 161 cancels the file transmission preparation of the firmware 165 (step S50), and terminates the process (step S51). As a result, the firmware 65 quits the state waiting for a new file transmission preparation response (step S4).

If the version number of the different exchange is older, the processor 161 stores the version number and location identifier of the different exchange in the memory 166 (step S47), and issues a new file transmission preparation request transmission request to the firmware 165 (step S48). The processor 161 then enters the state waiting for a new file transmission preparation response (step S49).

Upon receiving the new file transmission preparation request transmission request, the firmware 165 sets a new file transmission preparation response waiting flag in its memory (step S43). Then, the firmware 165 generates an FSP-OAM cell, and transmits the generated cell in the direction of a target exchange via the hardware 164.

Figure 27:
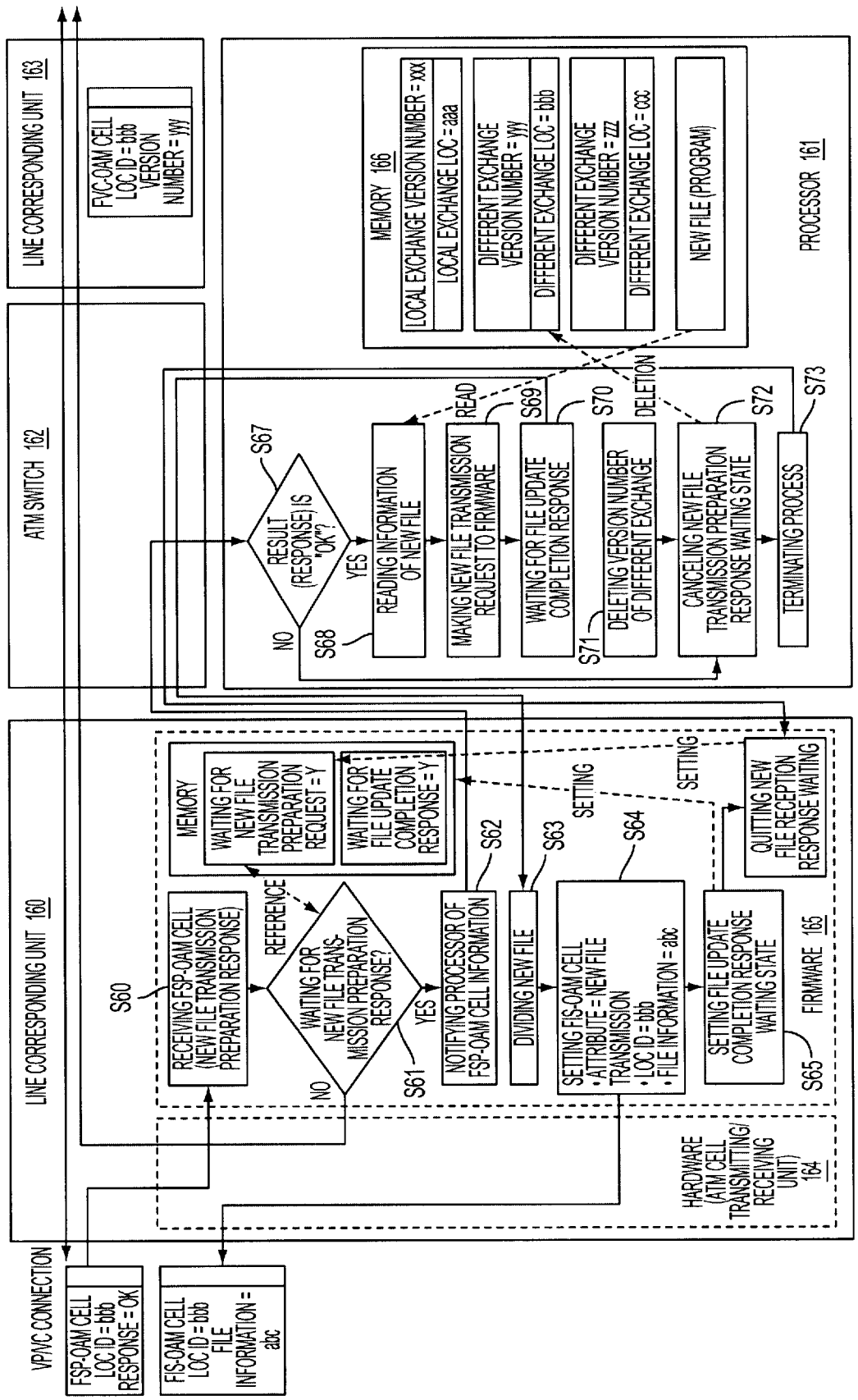
FIG. 27 is a flowchart showing the operations performed by the exchange when the file update request source receives the FSP-OAM cell (a new file transmission preparation response)

FIG. 27 is a flowchart showing the operations of an exchange when a file update request source receives an FSP-OAM cell (new file transmission preparation response).

Upon receiving the FSP-OAM cell, the hardware 164 of the line corresponding unit 160 notifies the firmware 165 that the cell has been received (step S60). The firmware then checks the new file transmission preparation response waiting flag stored in the memory of the line corresponding unit 160 (step S61). If the flag does not indicate a response waiting state, the same cell is transmitted to the downstream via the hardware 164. If the flag indicates the response waiting state, the firmware 165 notifies the processor 161 of the information of the FSP-OAM cell (step S62).

Upon receiving that information, the processor 161 checks the response identifier of the FSP-OAM cell (step S67). If the response is "NG", the processor 161 deletes the version number of the corresponding exchange, which is stored in the memory 166 of the processor 161 (step S71). At the same time, the processor 161 issues the request for cancelling the new file transmission preparation response waiting state to the firmware 165 (step S72), and terminates the process (step S73). As a result, the firmware 65 quits the new file transmission response waiting state in step S66.

If the response is "OK" as a result of the checking made in step S67, the processor 161 reads the new file (program) stored in the memory 166 of the processor 161 (step S68), and transmits the read new file to the firmware 165 (step S69). The firmware 65 then enters the state waiting for the completion of the file update (step S71).

The firmware 165 which has received the new file cuts this file down to the size of the file information field of the FIS-OAM cell (step S63), and stores the file in a plurality of cells, all of which are transmitted in the direction of the corresponding exchange (step S64). Lastly, the firmware 165 sets the file update completion waiting state in the memory (step S65).

Figure 28:
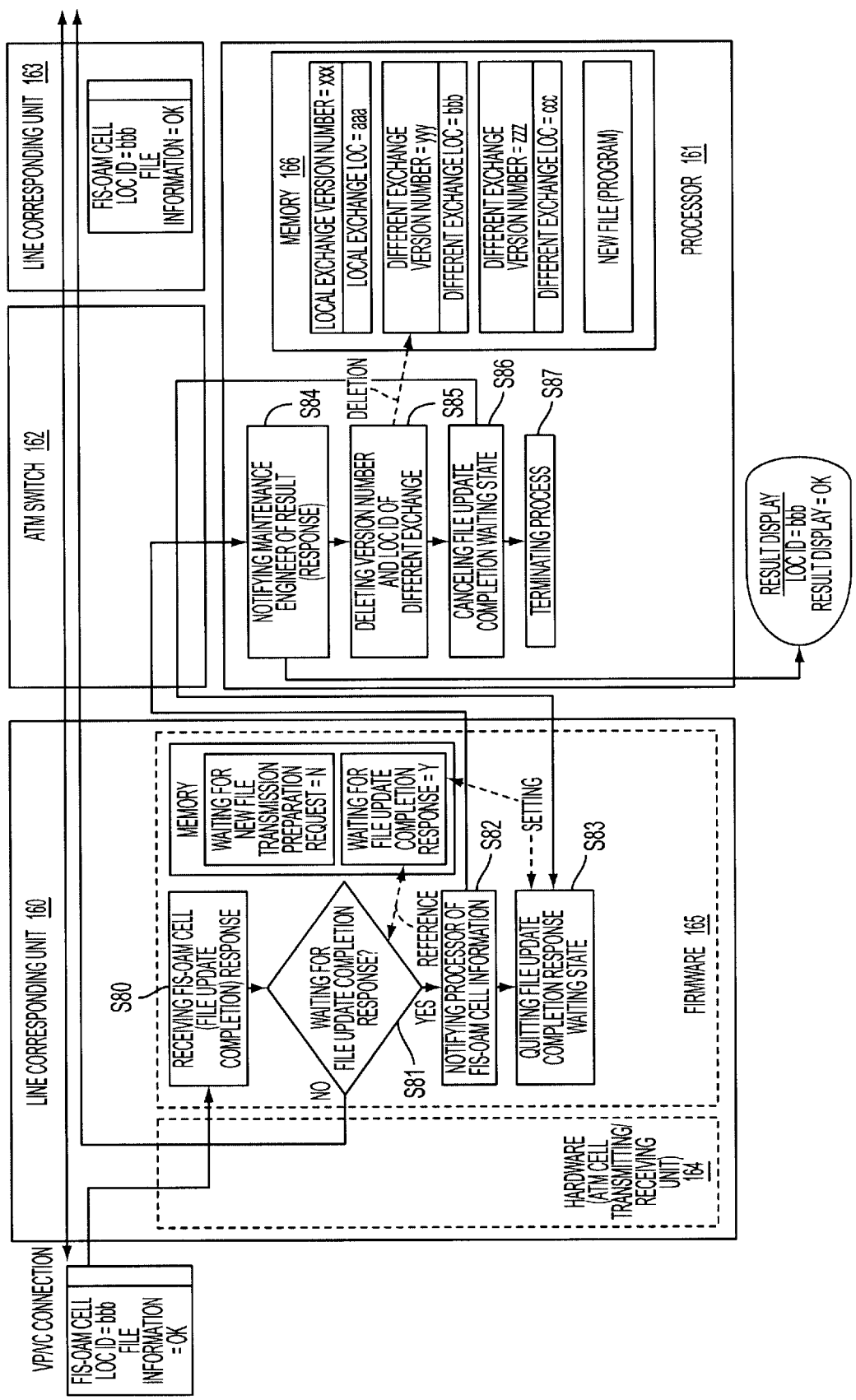
FIG. 28 is a flowchart showing the operations performed by the exchange when the file update request source receives the FIS-OAM cell (file update completion)

FIG. 28 is a flowchart showing the operations of an exchange when a file update request source receives the FIS-OAM cell (file update completion).

Upon receiving the FIS-OAM cell, the hardware 164 of the line corresponding unit 160 notifies the firmware 165 that the cell has been received (step S80). The firmware 165 checks a file update completion response waiting flag, which is stored in the memory of the line corresponding unit 160 (step S81). If the flag does not indicate the file update waiting state, the firmware 165 transmits the received FIS-OAM cell to the downstream. If the flag indicates the file update waiting state, the firmware 165 transmits the information of the FIS-OAM cell to the processor 161 (step S82).

The processor 161 notifies a maintenance engineer of the result of the file update performed in the different exchange, which is included in the file information field (step S84). Additionally, the processor 161 deletes the version number and location identifier of the different exchange, which are stored in the memory 166 of the processor 161 (step S85), and issues the request for cancelling the file update completion response waiting state to the firmware 165 (step S86). The processor 161 then terminates the process (step S87).

If the firmware 65 quits the file update completion response waiting state upon receipt of this notification (step S83), it means that the file update of one different exchange has been completed.

Figure 29:
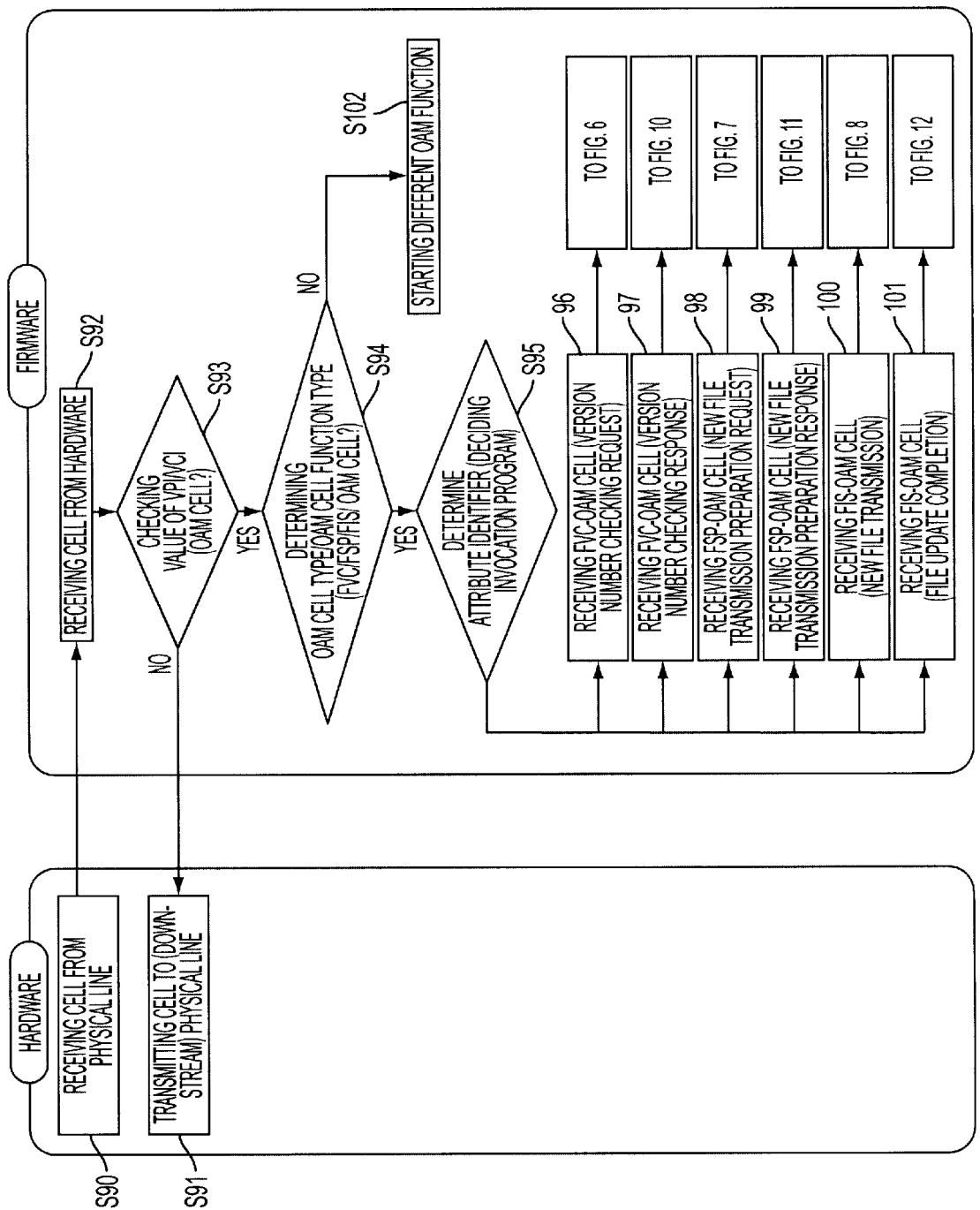
FIG. 29 is a flowchart showing the process for determining a cell type, which is performed by firmware of a line corresponding unit.

FIG. 29 is a flowchart showing the process for identifying a cell type, which is performed by the firmware of a line corresponding unit.

Upon receiving a certain cell (step S90), the hardware of the line corresponding unit transmits the received cell to the firmware (step S92), where the value of the VPI/VCI of that cell is checked (step S93). If the value of the VPI/VCI is that used by a user, the firmware transmits the same cell via the hardware to the downstream in the direction from which that cell is input. If the value of the VPI/VCI of the input cell is the value of an OAM cell (for example, any of 0 through 5), the firmware identifies the identifier and the function type of the OAM cell in the fundamental format, which is shown in FIG. 18, and determines whether or not the cell is any of the FVC-, FSP-, and FIS-OAM cells relating to the file update (step S94). If the cell is not the OAM cell relating to the file update, the firmware starts up a different OAM cell functionality (step S102). If the cell is the OAM cell relating to the file update, the firmware examines the attribute identifier of the cell in any of the FVC-, FSP-, and FIS-OAM cell formats defined in FIGS. 18 through 20, and determines which of the six types of the OAM cell, that is, which of the FVC-, FSP-, and FIS-OAM cells the OAM cell is (step S95).

If the cell is the FVC-OAM cell and if its attribute is determined to be the version number checking request, the firmware invokes the program for performing the process shown in FIG. 22 (step S96). If the attribute is determined to be the version number checking response for the FVC-OAM cell, the firmware invokes the program for performing the process shown in FIG. 26 (step S97). If the cell is the FSP-OAM cell and its attribute is determined to be the new file transmission preparation request, the firmware invokes the program for performing the process shown in FIG. 23 (step S98). If the cell is the FSP-OAM cell and if its attribute is determined to be the new file transmission preparation response, the firmware invokes the program for performing the process shown in FIG. 27 (step S99). If the cell is the FIS-OAM cell and its attribute is determined to be the new file transmission, the firmware invokes the program for performing the process shown in FIG. 24 (step S100). If the cell is the FIS-OAM cell and if its attribute is determined to be the file update completion, the firmware invokes the program for performing the process shown in FIG. 28 (step S101).

Figure 30:
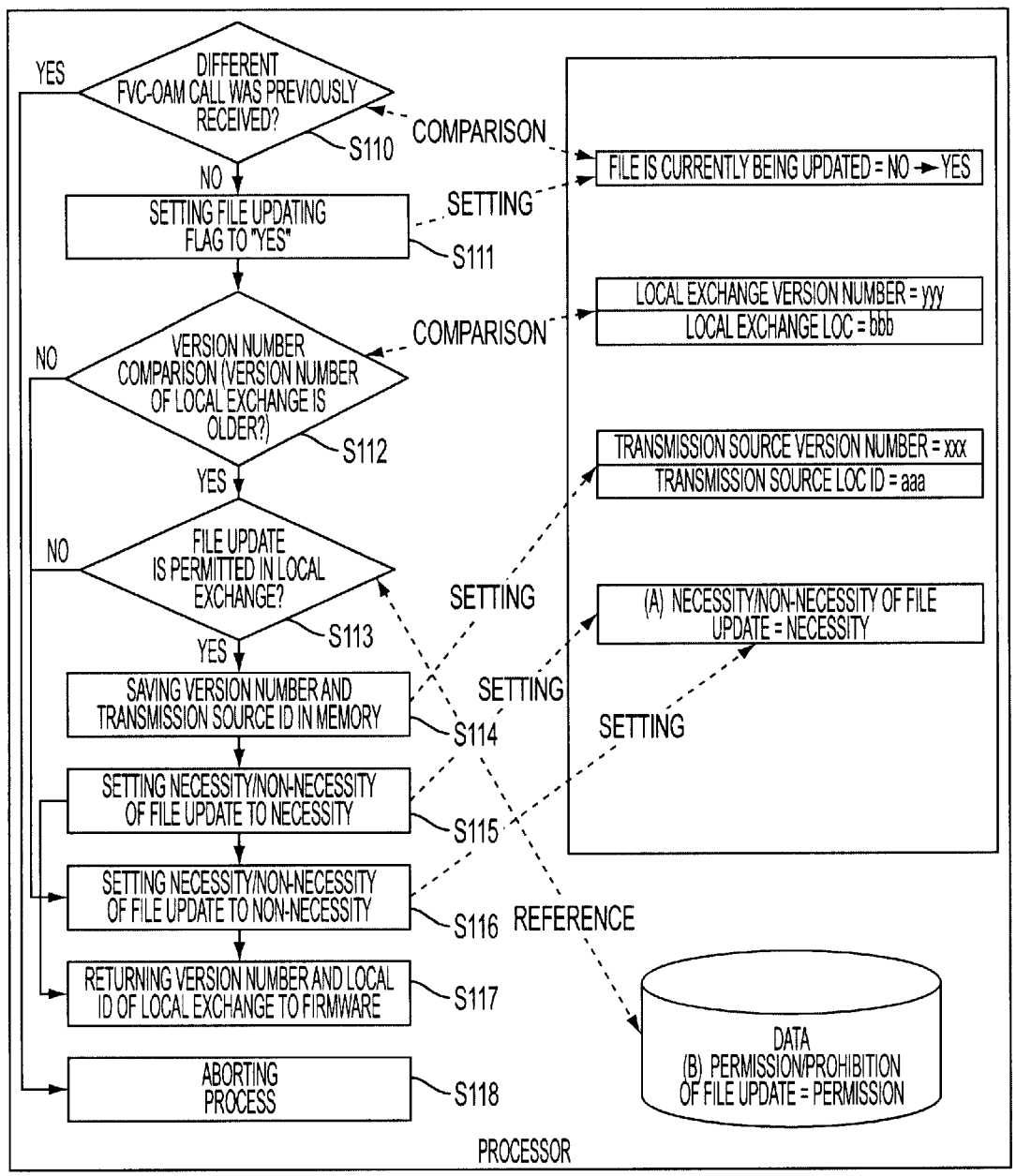
FIG. 30 is a flowchart showing the operations which are performed by a processor and are shown in FIG. 22, when the FVC-OAM cell is received.

FIG. 30 is a flowchart showing the process shown in FIG. 22, which is performed by the processor when the FVC-OAM cell is received.

Each exchange stores the permission/prohibition of a file update as data (B). This data is intended to determine the permission/prohibition of the file update request issued from a different exchange, and can be changed by the maintenance engineer of the corresponding exchange. The memory 166 of the processor 161 stores data A for determining the necessity/non-necessity of the file update. The data A is used to determine the necessity/non-necessity of the file update, when the file transmission preparation request of the FSP-OAM cell is received (refer to FIG. 23).

Explained below is how these data are used when the FVC-OAM cell is received, by referring to FIG. 30.

Upon receiving the FVC-OAM (file version number checking request) from the firmware 165, the processor 161 examines a file updating flag in the memory 166 in order to check whether or not a different FVC-OAM cell was previously received (step S110). If the different cell was previously received, the process is aborted at this time (step S118). If the file is not currently being updated, the processor 161 sets the file updating flag to "file currently being updated" (step Sill). Then, the processor 161 makes a comparison between the file version number information of the FVC-OAM cell and the file version number of the local exchange (step S112). If the version number of the local exchange is newer, the processor 161 sets the necessity/non-necessity of the file update (the data (A)) to "non-necessity" (step S116), and transmits the location identifier and the version number of the local exchange to the firmware 165 (step S117).

If the version number of the local exchange is older as a result of the comparison, the processor 161 determines whether the file update is either permitted or prohibited (data (B)) (step S113). If the file update is determined to be prohibited, the processor 161 sets the necessity/non-necessity of the file update to "non-necessity" (step S116), and makes notification to the firmware 165 (step S117).

If the file update is determined to be permitted, the processor 161 stores in the memory 166 the file version number and the location identifier of the different exchange, which are received with the FVC-OAM cell (step S114). If the process so far has been properly performed, the processor 161 sets the necessity/non-necessity of the file update (data (A)) to "necessity" (step S115), and transmits the version number and the location identifier of the local exchange to the firmware 165 (step S117). The firmware 165 then generates the FVC-OAM cell (version number checking response).

Figure 31:
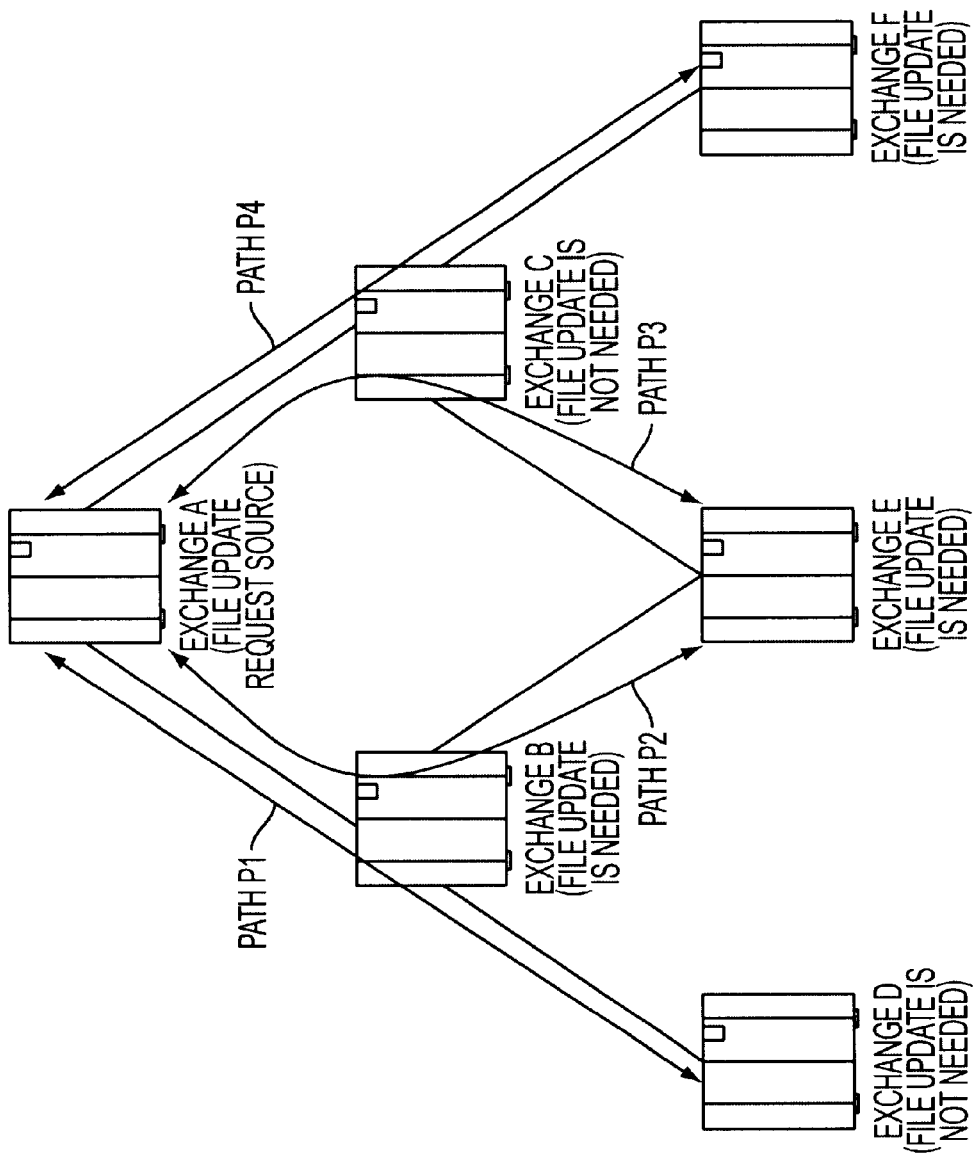
FIG. 31 is a schematic diagram explaining a file update implemented by applying to an ATM network configuration a method according to the second aspect of the preferred embodiment of the present invention.

Provided next is the explanation about the case where the file update is performed by applying the above described method to the configuration of the ATM network shown in FIG. 31.

In FIG. 31, there are six exchanges A through F, and the exchange A is assumed to be the request source of the file update. The exchanges B, E, and F among the exchanges B through F are assumed to perform the file update, while the exchanges C and D are assumed not to perform the file update.

The ATM connections on which the file update request is made from the exchange A are 4 connections "path P1 (A-B-D)", "path P2 (A-B-E)", "path P3 (A-C-E)", and "path P4 (A-C-F)".

Figure 32:
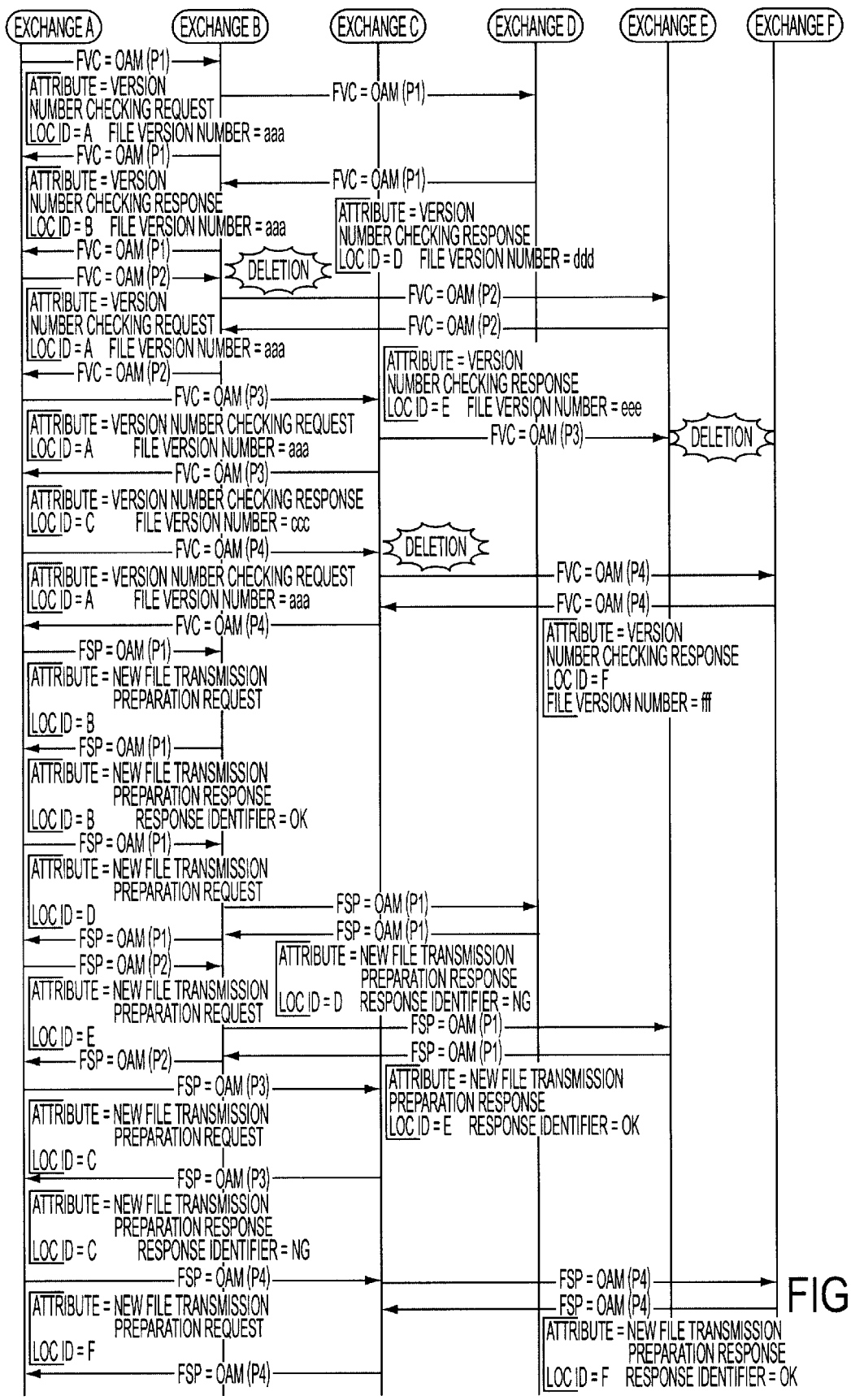
FIG. 32 is a timing sequence chart showing the movements of cells referred to in the explanation of FIG. 31 (No. 1)
Figure 33:
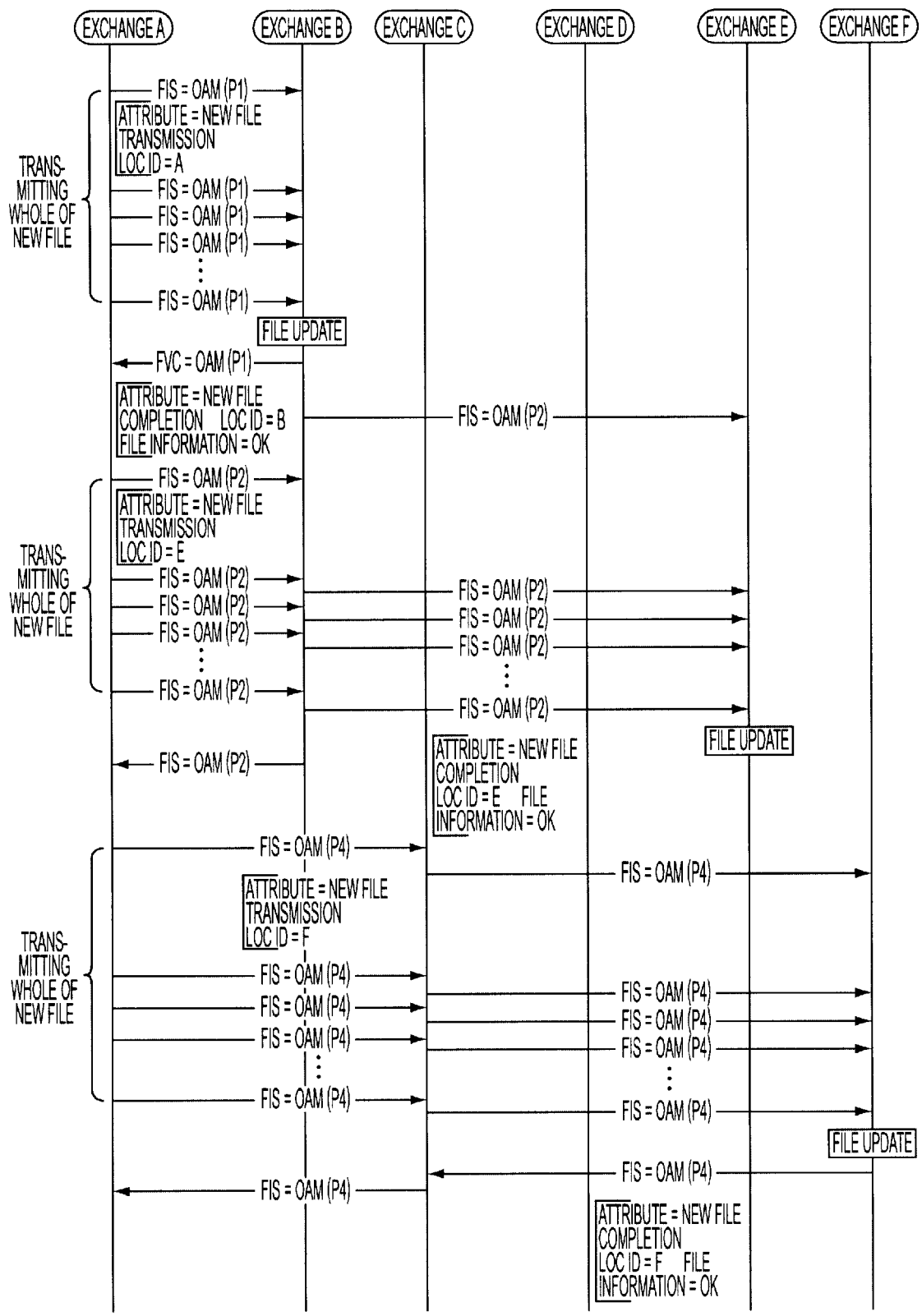
FIG. 33 is a timing sequence chart showing the movements of cells referred to in the explanation of FIG. 31 (No. 2).

File update order (FVC-OAM) cells are transmitted from the exchange A in the sequential order from the paths P1 through P4. FIGS. 32 and 33 illustrate the movements of the file update order cells at this time.

For ease of explanation, after the exchange A has received all of the FVC-OAM cells, it receives the next FSP-OAM cells in FIGS. 32 and 33. However, it is not always the case. The exchange A may transmit the FSP-OAM cell for a certain exchange upon completion of the reception of one of the FVC-OAM cells from the certain exchange. The same operation is applied also to the FIS-OAM cell.

The exchange A transmits the FVC-OAM cell (version number checking request) to the path P1. The exchange B returns the FVC-OAM cell (version number checking response). Also the exchange D on the path P1 returns the FVC-OAM cell (version number checking response).

The exchange A transmits the FVC-OAM cell (version number checking request) to the path P2. The exchange B on the path P2, however, ignores this cell. The FVC-OAM cell (version number checking request) is transmitted also to the exchange E in the downstream of the path P2. The exchange E returns the FVC-OAM cell (version number checking response).

The exchange A transmits the FVC-OAM cell (version number checking request) also to the path P3. The exchange C returns the FVC-OAM cell (version number checking response). However, the exchange E ignores this cell because it previously received the FVC-OAM cell.

On the path P4, the exchange C ignores the request cell, while the exchange F returns the FVC-OAM cell (version number checking response).

After receiving the FVC-OAM cell (version number checking response) from the exchange B on the path P1, the exchange A transmits the FSP-OAM cell (new file transmission preparation request) where the exchange B is specified (the location identifier=the exchange B) to the path P1. Upon receiving this cell, the exchange B sets the response identifier of the FSP-OAM cell (new file transmission preparation response) to "OK", and returns this cell to the exchange A. This is because the exchange B permits the file update. Both of the exchange E on the path P2 and the exchange F on the path P4 permit the file update similar to the exchange B. Therefore, these exchanges set to the response identifier of the FSP-OAM cell (new file transmission preparation response) to "OK", and returns this cell to the exchange A.

In the meantime, the exchange D on the path P1 and the exchange C on the path P3 prohibit the file update. Therefore, these exchanges set the response identifier of the FSP-OAM cell (new file transmission preparation response) to "NG" and returns this cell to the exchange A, upon receiving the FSP-OAM cell (new file transmission preparation request).

The exchange A receives the FSP-OAM cell (new file transmission preparation response) where the response identifier is set to "OK" from each of the exchanges B, E, and F. The exchange A then divides and stores the new file in the information fields of a plurality of FIS-OAM cells (new file transmission), and transmits all of the plurality of FIS-OAM cells to each of the exchanges B, E, and F.

Each of the exchanges B, E, and F saves the new file in the memory of the processor (or onto a hard disk). Upon completion of the reception of the whole of the new file, each of the exchanges B, E, and F performs the file update by using the saved file. If each of the exchanges B, E, and F has successfully performed the file update, it sets the FIS-OAM cell (file update completion) to "OK" and returns the cell to the exchange A. If each of the exchanges B, E, and F has unsuccessfully performed the file update, it sets the FIS-OAM cell (file update completion) to "NG" and returns the cell to the exchange A.

Here, the explanation is provided based on the assumption that the file update is performed after the new file is once saved in the memory or onto the hard disk of each of the exchanges. Since the file to be updated is the system file for controlling the operations of the exchanges, the timing at which the file update is performed is important in order to perform the file update by preventing the stoppage of an exchange service as much as possible. The method exactly the same as a conventional method with which a file is saved onto a storage medium, and a maintenance engineer carries this file to each exchange and performs a file update, can be applied to the implementation of this timing. Therefore, its explanation is omitted here.

Conventionally, it takes a considerable amount of time to perform a file update. This is because a storage medium on which a new file is saved is carried to an exchange where the file update is to be performed, and the new file is loaded from the storage medium. Additionally, a plurality of storage media onto which the new file is saved must be generated or a single medium must be repeatedly used and carried in order to perform the file update in a plurality of exchanges.

According to the present invention, a storage medium or storage media for a new file is no longer needed, and the new file can be simultaneously transmitted to a plurality of exchanges. Therefore, the time resources and physical resources (such as a storage medium, etc.) can be reduced when a file update is performed in a plurality of exchanges.

What is claimed is:

1. A network managing method for performing maintenance and management with specification from an exchange to a different exchange in a network, comprising:

transmitting an order for performing maintenance and management by specifying an exchange at an order request destination from an exchange at an order request source with a control cell, and executing the order with the control cell in the exchange at the order request source, which has received the control cell, wherein the control cell is composed of a header and an information field, the information field including a request identifier indicating contents of the order, a sequence number when the order is divided and transmitted, and a total number indicating a number of divisions.

2. The network managing method according to claim 1, wherein:

the exchange at the order request destination sets permission/prohibition of execution of the order from the exchange at the order request source in a table, makes a comparison between contents of the order with the control cell and contents set in the table, and executes the order only if the execution of the order from the exchange at the order request source is permitted.

3. The network managing method according to claim 1, wherein:

the exchange at the order request destination returns a result of the execution of the order from the exchange at the order request source to the exchange at the order request source, and makes a maintenance terminal of the local exchange itself display contents of the order and the result of the execution of the order.

4. A network managing system for maintaining and managing a network where a plurality of exchanges are connected, wherein an exchange at an order request source includes:
- a maintenance terminal for specifying an exchange at an order request destination and inputting an order;
- a controlling unit for editing the order with the order input from said maintenance terminal, and for controlling each unit;
- a line corresponding unit for storing the order in an information field of a control cell and transmitting the control cell, according to an instruction issued from said controlling unit; and
- an ATM switch for routing the ATM cell, and wherein the exchange at the order request destination includes:
- a line corresponding unit for receiving and identifying a control cell which is transmitted from the exchange at the order request source and is addressed to the local exchange itself, and extracting the order of the control cell;
- a controlling unit for performing control according to the order extracted by said line corresponding unit; and
- an ATM switch for routing the ATM cell; and wherein
  said line corresponding unit of the exchange at the order request source assigns a sequence number indicating a transmission order and a total number indicating a number of divisions to each control cell when an order is divided and is transmitted; and said line corresponding unit of the exchange at the order request destination determines completion of reception of the order according to the sequence number and the total number of a received control cell, and transmits the order to said controlling unit.

5. The network managing system according to claim 4, wherein:

the exchange at the order request destination includes a table for setting permission/prohibition of execution of an order from the exchange at the order request source; and said controlling unit determines whether execution of a received order is either permitted or prohibited by referencing the table, and executes the order only if the execution is permitted.

6. The network managing system according to claim 4, wherein said line corresponding unit of the exchange at the order request destination returns a result of the execution of the order from the exchange at the order request source to the exchange at the order request source according to the control of said controlling unit, and includes a maintenance terminal for displaying contents of the order and the result of the execution according to the control of said controlling unit.

7. The network managing method according to claim 2, wherein:

the exchange at the order request destination returns a result of the execution of the order from the exchange at the order request source to the exchange at the order request source, and makes a maintenance terminal of the local exchange itself display contents of the order and the result of the execution of the order.

8. The network managing system according to claim 5, wherein said line corresponding unit of the exchange at the order request destination returns a result of the execution of the order from the exchange at the order request source to the exchange at the order request source according to the control of said controlling unit, and includes a maintenance terminal for displaying contents of the order and the result of the execution according to the control of said controlling unit.

* * * * *